(12) United States Patent
Tanaka et al.

(10) Patent No.: US 7,978,057 B2
(45) Date of Patent: Jul. 12, 2011

(54) INFORMATION STORAGE APPARATUS

(75) Inventors: Shinichi Tanaka, Kobe (JP); Minoru Yoshimura, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 335 days.

(21) Appl. No.: 12/292,121

(22) Filed: Nov. 12, 2008

(65) Prior Publication Data
US 2009/0121850 A1 May 14, 2009

(30) Foreign Application Priority Data

Nov. 14, 2007 (JP) ................................. 2007-296024

(51) Int. Cl.
*B60Q 1/00* (2006.01)
(52) U.S. Cl. .................. 340/438; 340/426.1; 340/425.5; 340/426.26; 340/565; 382/104
(58) Field of Classification Search .................. 340/538, 340/425.5, 426.1, 426.25, 426.26, 565; 382/104
See application file for complete search history.

(56) References Cited

U.S. PATENT DOCUMENTS

| | | | |
|---|---|---|---|
| 6,621,411 B2 * | 9/2003 | McCarthy et al. | 340/425.5 |
| 6,980,092 B2 * | 12/2005 | Turnbull et al. | 340/425.5 |
| 7,298,246 B1 * | 11/2007 | Schmitt | 340/426.1 |
| 7,579,938 B2 * | 8/2009 | Teshima et al. | 340/5.72 |
| 2007/0109106 A1 | 5/2007 | Maeda et al. | |

FOREIGN PATENT DOCUMENTS

| | | |
|---|---|---|
| JP | A-07-296210 | 11/1995 |
| JP | A-2000-128031 | 5/2000 |
| JP | A-2000-280821 | 10/2000 |
| JP | A-2001-061129 | 3/2001 |
| JP | A-2006-123650 | 5/2006 |
| JP | A-2006-235732 | 9/2006 |
| JP | A-2007-157113 | 6/2007 |

* cited by examiner

*Primary Examiner* — Davetta W Goins
(74) *Attorney, Agent, or Firm* — Oliff & Berridge, PLC

(57) ABSTRACT

There is provided an information storage apparatus capable of storing information on a parked vehicle acquired before and after detection of unusual conditions with lesser amount of power to be consumed. During halt of a vehicle, at least one of image information and sound information of the interior of the vehicle is acquired by an anti-theft device main body, and the acquired information is transmitted from the anti-theft device main body to a drive recorder at a transmission interval that varies between before and after detection of unusual vehicle conditions by the anti-theft device main body. A drive recorder main body allows a second RAM to store therein information received from an anti-theft device at a second transmission period and information received from the anti-theft device at a first transmission period.

6 Claims, 13 Drawing Sheets

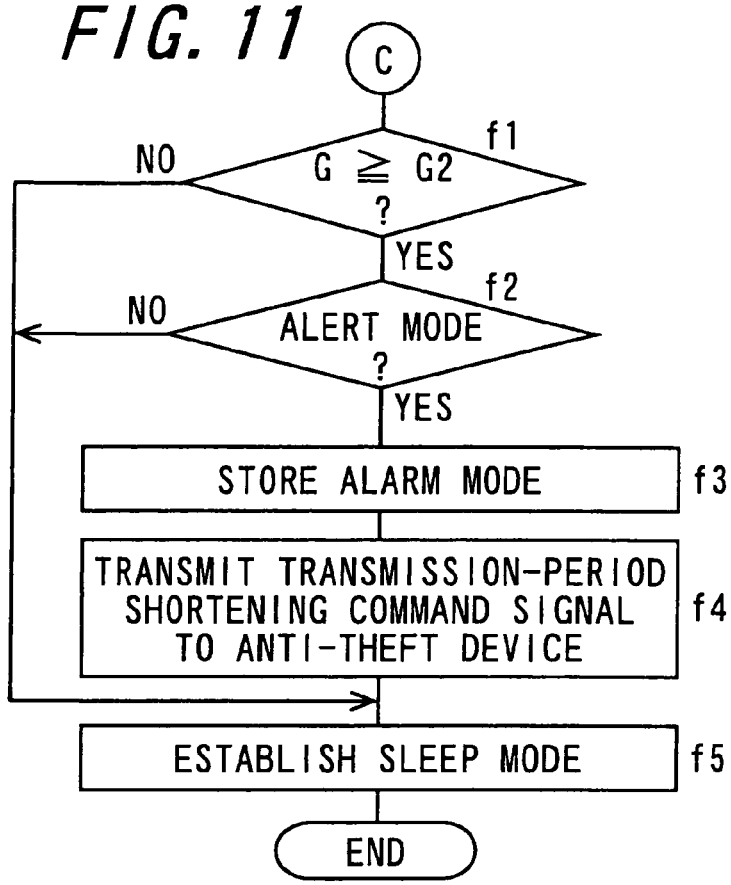
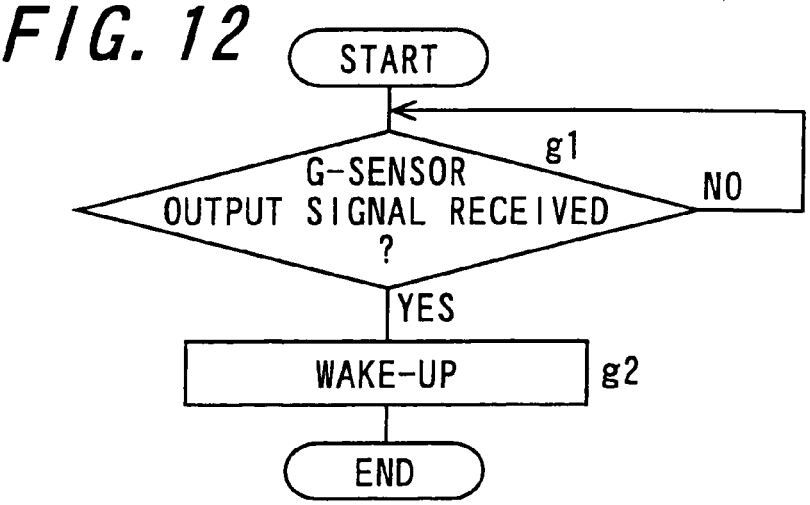

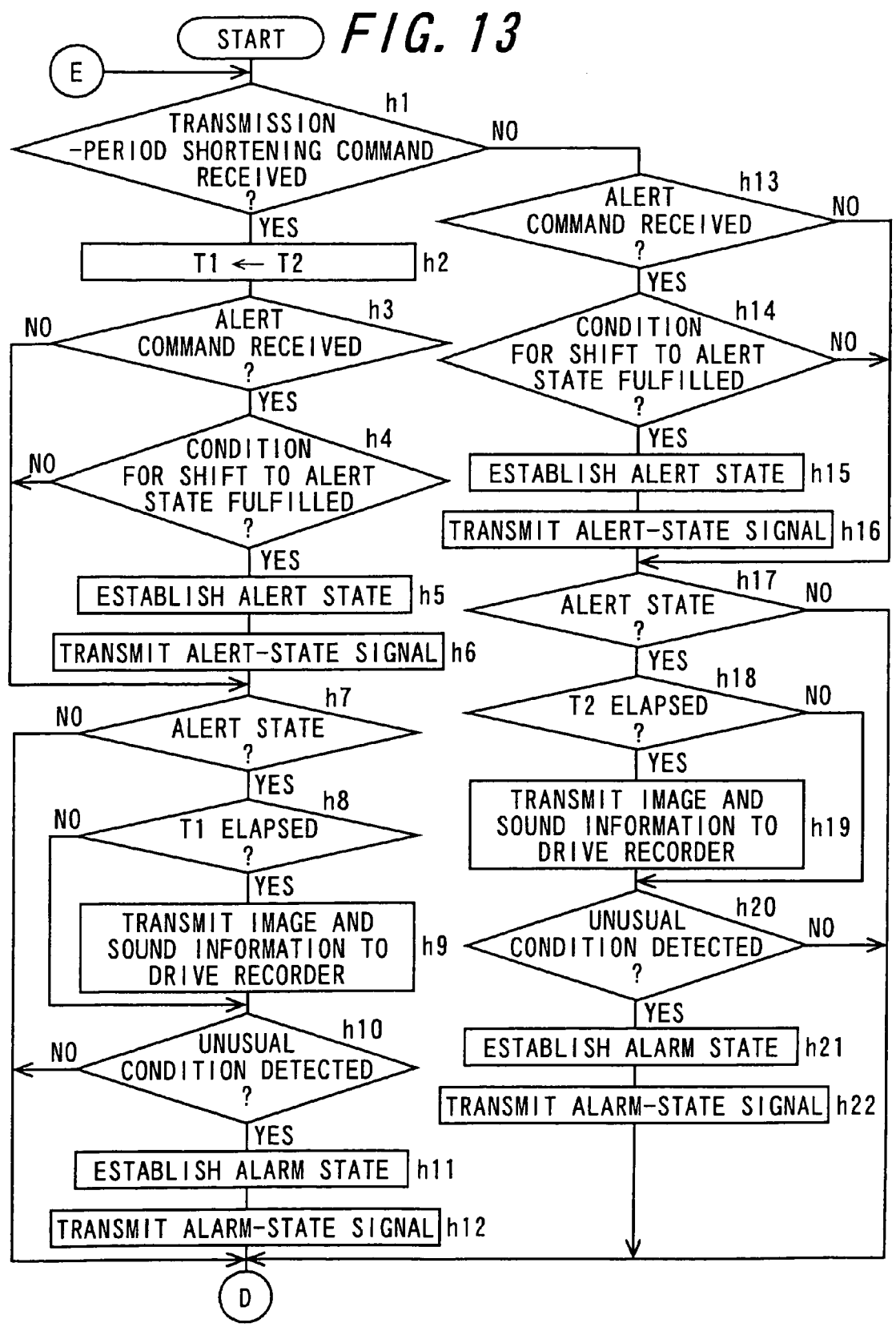

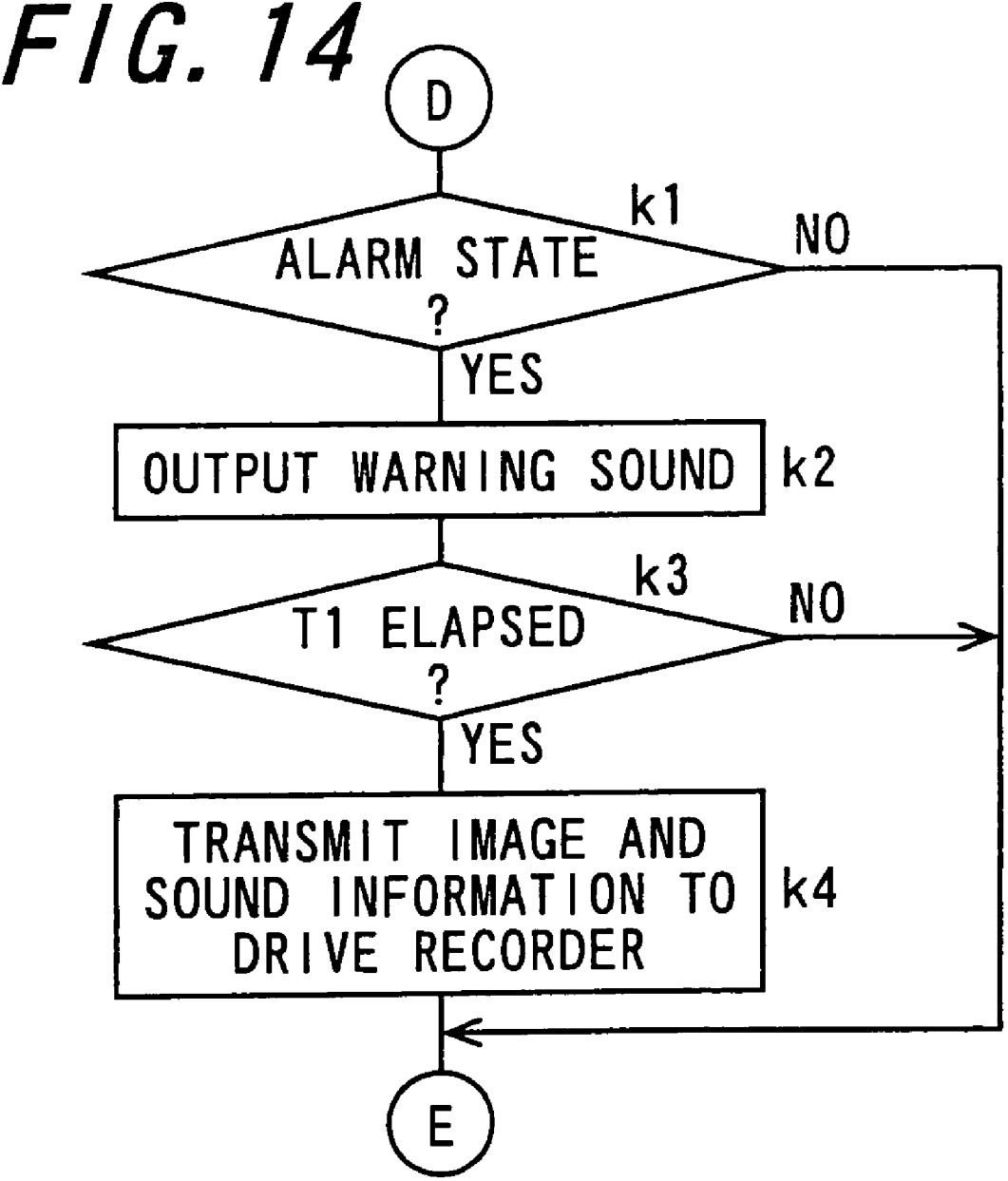

INFORMATION STORAGE APPARATUS

BACKGROUND OF THE INVENTION

1. Field of the Invention

The present invention relates to an information storage apparatus for storing information acquired, for example, by a vehicle-mounted camera and/or microphone in a memory medium.

2. Description of the Related Art

There have been developed for practical use apparatuses having a so-called anti-theft function that effects, upon detection of unusual conditions such as theft to a parked vehicle, for example, upon detection of unusual conditions such as a shock to a vehicle and vehicle break-in committed by third parties other than the user, photographing of vehicle interior by means of a camera attached within the vehicle interior, and then records taken images on a recording medium. Such a technique is disclosed in Japanese Unexamined Patent Publications JP-A 2006-123650, JP-A 2001-61129, JP-A 2007-157113, and JP-A 2006-235732, for example.

Assuming that vehicle interior is photographed not only at the moment of detection of unusual conditions of a parked vehicle but also in advance of occurrence of vehicle unusual conditions and taken images are stored in a memory medium such as RAM, and, upon detection of unusual conditions, images taken before and after the moment of detection are recorded on a nonvolatile recording medium, in this case, it is possible to obtain images representing the conditions of the vehicle during the time the user stayed away from it. Accordingly, such a system is effective in conducting analysis of vehicle unusual conditions. However, a vehicle is brought to a stop with its engine switched off, and thus battery charging cannot be effected during the stop. Therefore, if photographing is carried out continuously in advance of detection of unusual conditions, the battery may possibly run out.

SUMMARY OF THE INVENTION

An object of the invention is to provide an information storage apparatus capable of storing information on a parked vehicle acquired before and after the moment of detection of unusual conditions with lesser amount of power to be consumed.

An information storage apparatus of the invention comprises an acquisition section, a storage section, an unusual-condition detection section, and a storage control section. The acquisition section acquires at least one of image information and sound information of an interior and outside of a vehicle. The storage section stores therein the information acquired by the acquisition section. The unusual-condition detection section detects the presence or absence of unusual vehicle conditions on the basis of a signal issued from a sensor disposed in the vehicle. The storage control section exercises control in such a manner that the information acquired by the acquisition section is stored in the storage section at a storage interval that varies between before and after detection of unusual vehicle conditions by the unusual-condition detection section.

According to the invention, at least one of the image information and the sound information of the interior and outside of the vehicle acquired by the acquisition section before the detection of unusual vehicle conditions by the unusual-condition detection section, and the said information acquired by the acquisition section after the detection of unusual vehicle conditions are stored in the storage section at different storage intervals. For example, the information acquired after the detection of unusual vehicle conditions is stored in the storage section at a shorter storage interval than the information acquired before the detection of unusual vehicle conditions is. Accordingly, the information acquired before and after the detection of unusual vehicle conditions can be stored in the storage section without fail with lesser amount of power to be consumed.

BRIEF DESCRIPTION OF THE DRAWINGS

Other and further objects, features, and advantages of the invention will be more explicit from the following detailed description taken with reference to the drawings wherein:

FIG. 11 is a flow chart showing an operational procedure to be followed by the drive-recorder CPU in a vehicle-stopped state;

FIG. 12 is a flow chart showing a wakeup-related operational procedure to be followed by the drive-recorder CPU;

FIG. 13 is a flow chart showing an operational procedure to be followed by the anti-theft CPU; and FIG. 14 is a flow chart showing an operational procedure to be followed by the anti-theft CPU.

DETAILED DESCRIPTION

Figure 1:
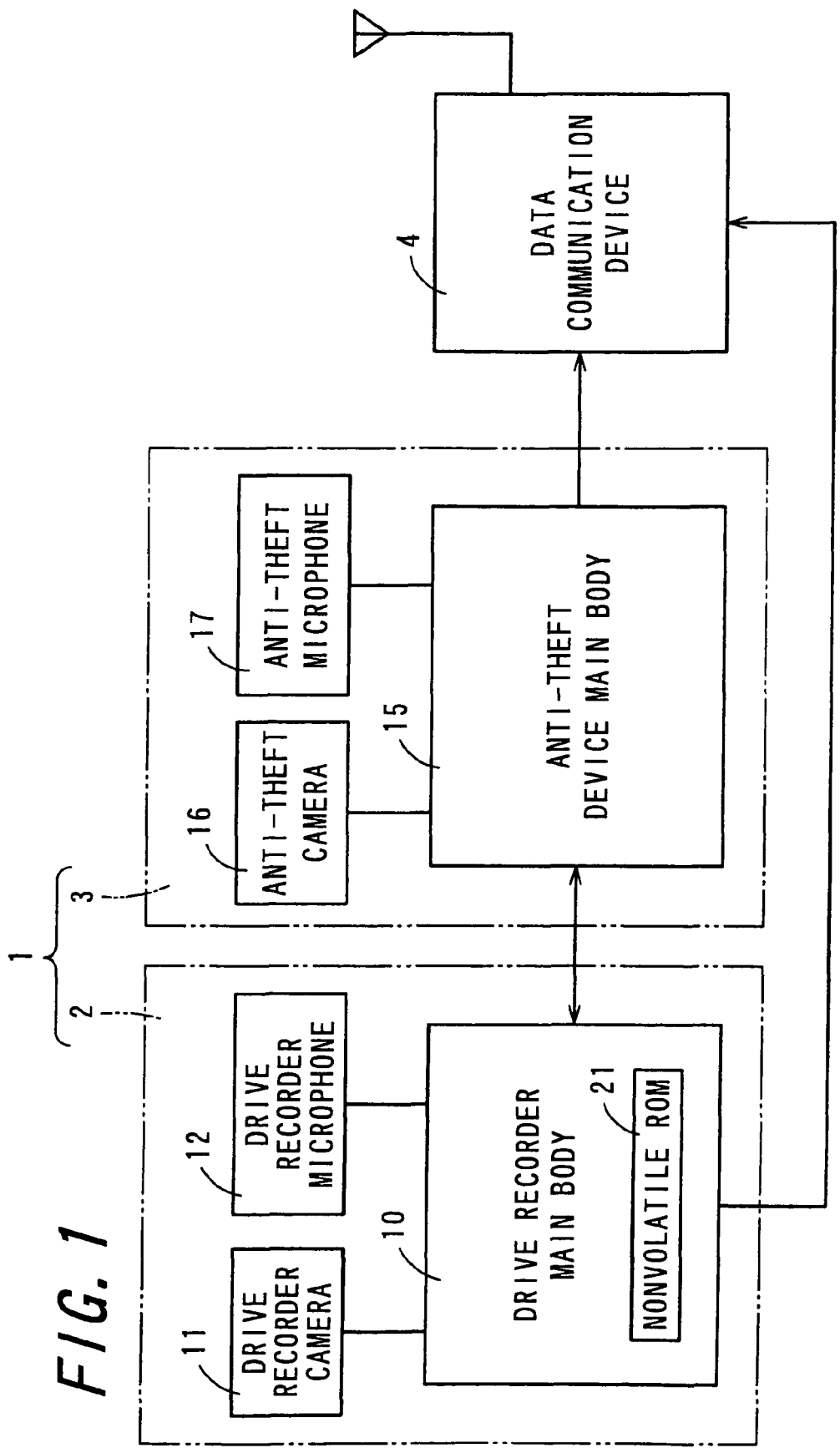
FIG. 1 is a view showing the configuration of an information storage apparatus in accordance with a first embodiment of the invention in simplified manner.

Now referring to the drawings, preferred embodiments of the invention will be described in detail.

In the following description, such constituent components as are common to those described by way of the preceding embodiment will be identified with the same reference symbols, and overlapping descriptions may be omitted. In a case where only part of the construction of an embodiment is described, the other part thereof will be regarded as the same as that of the preceding embodiment.

FIG. 1 is a view showing the configuration of an information storage apparatus 1 in accordance with a first embodiment of the invention in simplified manner. The information storage apparatus 1 includes a drive recorder 2 and an anti-theft device 3 acting as a security device. For example, the information storage apparatus 1 is mounted in a vehicle. The drive recorder 2 and the anti-theft device 3 are electrically and communicatively connected to each other. The drive recorder 2 and the anti-theft device 3 are each electrically connected to a data communication device 4 disposed externally of the information storage apparatus 1.

The drive recorder 2 includes a drive recorder main body 10, a drive recorder camera 11, and a drive recorder microphone 12. The drive recorder camera 11 and the drive recorder microphone 12 are electrically connected to and provided independently of the drive recorder main body 10. During the interval when a vehicle is being in motion, to be specific, during the time an ignition (IG) switch is in an ON state or an accessory (ACC) switch is in an ON state, the drive recorder main body 10 allows a non-illustrated RAM (Random Access Memory) to store therein image information representing images taken by the drive recorder camera 11 and sound information representing sounds collected by the drive recorder microphone 12 in an endless manner every time a predetermined time has elapsed. Moreover, during the halt of the vehicle, the drive recorder main body 10 allows the RAM to store therein image information and sound information transmitted from the subsequently-described anti-theft device 3 in an endless manner.

Although the following description deals with an embodiment in which the drive recorder main body 10 acts to store both of image information representing images taken by the drive recorder camera 11 and sound information representing sounds collected by the drive recorder microphone 12 in the RAM, it is possible to store only one of the image information and the sound information.

During the interval when a vehicle is being in motion, to be specific, during the time an ignition (IG) switch is in an ON state or an accessory (ACC) switch is in an ON state, upon detection of a predetermined trigger, for example, upon detection of a predetermined shock given to the vehicle, the drive recorder main body 10 allows a recording medium, to be specific, Compact Flash (trademark) card (hereafter also referred to simply as "CF card") which is a nonvolatile memory, to record the image information and the sound information stored in the RAM thereon.

The drive recorder main body 10 has a nonvolatile ROM 21. The nonvolatile ROM 21 is realized by the use for example of a flash ROM (Flash Read Only Memory: F-ROM for short). During the halt of the vehicle, to be specific, during the time the IG switch is in an OFF state or the ACC switch is in an OFF state, upon detection of occurrence of something unusual such as an act of theft which will hereafter be described, the drive recorder main body 10 allows the nonvolatile ROM 21 to record thereon the RAM-stored image and sound information obtained before and after the detection of unusual conditions and gives it to the data communication device 4. The image and sound information given to the data communication device 4 is transmitted to an external communication apparatus, such as a portable telephone or center equipment, by means of wireless radio communication.

The drive recorder main body 10 allows the nonvolatile ROM 21 or the non-illustrated RAM to record thereon or store therein the image and sound information transmitted from the anti-theft device 3 at a storage period that varies according to a state of security of the parked vehicle determined by a subsequently-described anti-theft device main body. The state of security refers to an alert state or an alarm state. The details of the alert state and the alarm state will be described later.

The anti-theft device 3 includes an anti-theft device main body 15, an anti-theft camera 16, and an anti-theft microphone 17. The anti-theft camera 16 and the anti-theft microphone 17 are electrically connected to and provided independently of the anti-theft device main body 15.

The anti-theft device main body 15 determines whether the state of security of the vehicle is the alert state or the alarm state, and transmits a signal indicative of the determined security state to the drive recorder 2. Moreover, under the alert state and the alarm state as well, the anti-theft device main body 15 acquires the image information and the sound information via the anti-theft camera 16 and the anti-theft microphone 17, and transmits the acquired information from the anti-theft device 3 to the drive recorder 2 at a transmission period which varies according to a determined security state.

Although the following description deals with an embodiment in which the anti-theft device main body 15 transmits both of image information representing images taken by the anti-theft camera 16 and sound information representing sounds collected by the anti-theft microphone 17 to the drive recorder 2, in the anti-theft device main body 15, it is possible to acquire only one of the image information and the sound information and transmit the acquired information to the drive recorder 2.

Figure 2:
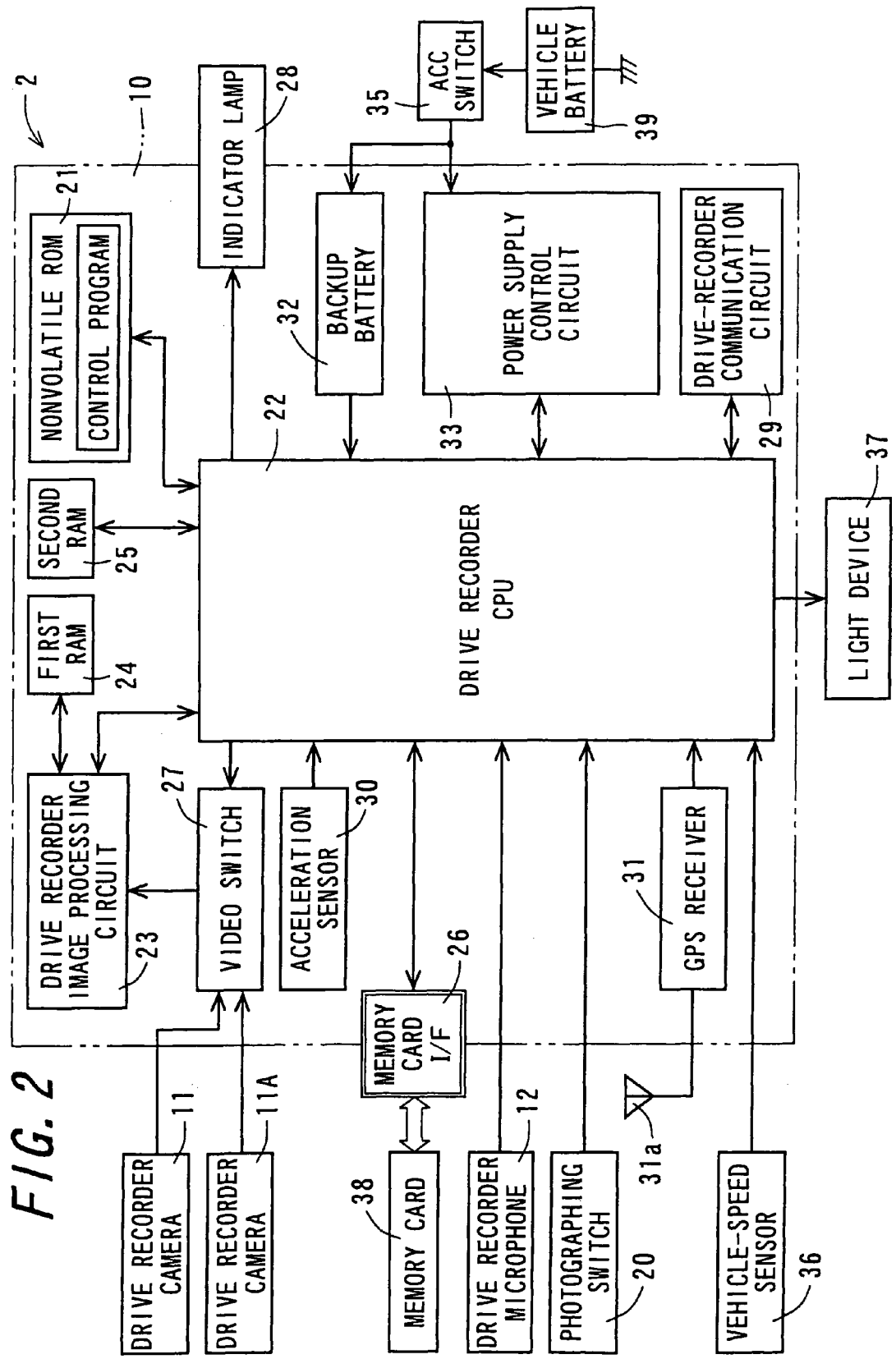
FIG. 2 is a block diagram showing the electrical configuration of a drive recorder.

FIG. 2 is a block diagram showing the electrical configuration of the drive recorder 2. The drive recorder 2 includes a drive recorder main body 10, two units of drive recorder cameras 11 and 11A, and a drive recorder microphone 12. The drive recorder cameras 11 and 11A are realized by using CCD (Charge Coupled Device) cameras. For example, the drive recorder camera 11 is placed on a windshield located at the back of a rearview mirror via a bracket to take pictures of areas ahead of the vehicle. That is, the drive recorder camera 11 is disposed fixedly so as to face the front of the vehicle. The drive recorder camera 11A is provided to take pictures of vehicle interior and is thus disposed fixedly at a position to allow photographing of vehicle interior. Moreover, in addition to the front camera and the interior camera, for example, an extra camera for taking pictures of areas at the rear of the vehicle can also be provided. There may be a case where a photographing switch 20 is electrically connected to and provided independently of the drive recorder main body 10 thereby to effect photographing by a plurality of drive recorder cameras 11. The drive recorder microphone 12 is disposed at a position to allow collection of sounds in the interior of the vehicle.

The drive recorder main body 10 includes: the nonvolatile ROM 21; a drive-recorder CPU (Central Processing Unit) 22; a drive-recorder image processing circuit 23; a first RAM 24; a second RAM 25; a memory card interface (memory card I/F for short) 26; a video switch 27; an indicator lamp 28; a drive-recorder communication circuit 29; an acceleration sensor (hereafter also referred to as "G sensor") 30; a GPS (Global Positioning System) receiver 31; a backup battery 32; and a power supply control circuit 33.

The nonvolatile ROM 21 is realized by the use for example of an F-ROM. The nonvolatile ROM 21 stores therein a control program for exercising centralized control over hardware resources constituting the drive recorder main body 10. Moreover, during the time the IG switch is in an OFF state or the ACC switch is in an OFF state, when the drive-recorder communication circuit 29 receives, from the subsequently-described anti-theft device 3, an alarm-state signal indicating that the state of security is the alarm state; that is, a signal indicative of vehicle break-in by third parties other than the user, namely a state where anti-theft operation is under way upon the detection of an act of theft, the nonvolatile ROM 21 stores therein image information of a predetermined number of images taken by the drive recorder camera 11 before and after the alarm state has been established, as well as sound information of sounds collected by the drive recorder microphone 12 before and after the alarm state has been established, and also image information of a predetermined number of images taken by the anti-theft camera 16 before and after the establishment of the alarm state and sound information of sounds collected by the anti-theft microphone 17 before and after the establishment of the alarm state that the drive-recorder communication circuit 29 received from the anti-theft device 3.

The drive-recorder CPU 22 exercises centralized control over the constituent components of the drive recorder main body 10, namely the nonvolatile ROM 21, the drive-recorder image processing circuit 23, the second RAM 25, the memory card I/F 26, the video switch 27, the indicator lamp 28, the drive-recorder communication circuit 29, and the power supply control circuit 33, by executing the control program stored in the nonvolatile ROM 21. Connected electrically to the drive-recorder CPU 22 are: the nonvolatile ROM 21; the drive-recorder image processing circuit 23; the second RAM 25; the memory card I/F 26; the video switch 27; the indicator lamp 28; the drive-recorder communication circuit 29; the G sensor 30; the GPS receiver 31; the backup battery 32; the power supply control circuit 33; the drive recorder microphone 12; the photographing switch 20; a vehicle-speed sensor 36; and a light device 37.

The drive-recorder CPU 22 adds up vehicle-speed pulse signals issued from the vehicle-speed sensor 36 to identify the running speed of the vehicle (hereafter referred to as "vehicle speed"). When the interior of the vehicle is photographed by the drive recorder camera 11A provided to take pictures of vehicle interior, the drive-recorder CPU 22 effects turning-on of the light device 37 realized by the use for example of a light emitting diode (LED for short).

For example, the drive-recorder image processing circuit 23 is realized by using a JPEG IC (JPEG: Joint Photographic coding Experts Group, IC: Integrated Circuit). The drive-recorder image processing circuit 23 converts an image taken by the drive recorder camera 11 or 11A and inputted to the drive recorder main body 10 into image information in JPEG format.

The first RAM 24 and the second RAM 25 are realized by the use for example of an SD-RAM (Synchronous Dynamic Random Access Memory). The first RAM 24 temporarily stores therein the image information converted into JPEG-format information by the drive-recorder image processing circuit 23.

The second RAM 25 is constructed of a ring buffer memory. The second RAM 25 stores successively therein, in an endless manner, a G-sensor output value which is detected by the subsequently-described acceleration sensor 30 and identified by the drive-recorder CPU 22; vehicle-speed information representing vehicle speed which is identified by the drive-recorder CPU 22 on the basis of a vehicle-speed pulse signal outputted from the vehicle-speed sensor 36; image information converted into JPEG-format information by the drive-recorder image processing circuit 23; sound information representing sounds collected by the drive recorder microphone 12; vehicle-position information representing the position of the vehicle which is identified by the drive-recorder CPU 22 on the basis of a plurality of radio signals issued from the GPS receiver 31; and so forth.

Moreover, during the time the IG switch is in an OFF state or the ACC switch is in an OFF state, when the drive-recorder communication circuit 29 receives, from the subsequently-described anti-theft device 3, an alert-state signal indicating that the state of security is the alert state; that is, an signal indicative of something unusual such as vehicle break-in by third parties other than the user, namely a state where the presence or absence of an act of theft is being detected, the second RAM 25 stores therein information of images taken by the drive recorder camera 11 and information of sounds collected by the drive recorder microphone 12, and also information of images taken by the anti-theft camera 16 and information of sounds collected by the anti-theft microphone 17 under the alert state that the drive-recorder communication circuit 29 received from the anti-theft device 3.

The drive recorder main body 10 is so designed as to have access to a memory card 38 which is detachably attached to the drive recorder main body 10, for example a CF card, via the memory card I/F 26. Note that the memory card 38 which is detachably attached to the drive recorder main body 10 is not limited to the aforementioned CF card, but may be of an SD (Secure Digital) memory card, a memory stick, or a smart-media card. In a case where a CF card is mentioned in the following description, it is designated by the same reference numeral "38" as the memory card.

In a case where a plurality of drive recorder cameras 11 are provided, the video switch 27 serves as a selector switch for allowing selection among the drive recorder cameras 11 that effect photographing at predetermined time intervals.

The indicator lamp 28 is realized by the use for example of an LED. Under abnormal conditions, for example, in the presence of abnormality in the acceleration sensor 30, abnormality in the drive-recorder image processing circuit 23, camera connection troubles such as failure in electrical connection between the drive recorder camera 11 and the drive recorder main body 10 and occurrence of a break between the drive recorder camera 11 and the drive-recorder image processing circuit 23, and hardware errors such as occurrence of a break between the drive-recorder image processing circuit 23 and the drive-recorder CPU 22, the indicator lamp 28 lights up for a predetermined period of time or blinks at a predetermined flashing interval under the instruction of the drive-recorder CPU 22.

The drive-recorder communication circuit 29 functions as a communication interface for establishing communicative connection with the anti-theft device main body 15 and with the data communication device 4.

The G sensor 30 is capable of detecting acceleration of gravity, namely G force which is exerted in a direction of from front to rear of the vehicle and in a direction of from right to left of the vehicle as well, which is a so-called G-sensor output value. A direction in which the vehicle is headed is the front-rear direction comprising a direction toward the front of the vehicle and a direction toward the rear of the vehicle. Moreover, a horizontal direction with respect to the direction toward the front of the vehicle is the right-left direction. A direction perpendicular to the front-rear direction and to the right-left direction is a vertical direction. The front-rear direction is defined as a Y-axis direction, and the right-left direction is defined as an X-axis direction. A G-sensor output value in the X-axis direction and a G-sensor output value in the Y-axis direction are detected separately. The G sensor 30 provides signals indicative of the detected G-sensor output values in both the X-axis direction and the Y-axis direction to the drive-recorder CPU 22. On the basis of the signals indicative of the G-sensor output values outputted from the G sensor 30, the drive-recorder CPU 22 identifies the G-sensor output value in the X-axis direction and that in the Y-axis direction.

The GPS receiver 31 receives, via a GPS antenna 31a, a plurality of radio signals transmitted from a non-illustrated GPS satellite. The received plurality of radio signals are provided from the GPS receiver 31 to the drive-recorder CPU 22. On the basis of a plurality of radio signals issued from the GPS receiver 31, the drive-recorder CPU 22 identifies the position of the vehicle.

In the drive recorder 2, regardless of whether the ACC switch 35 is in an ON state or in an OFF state, electric power is supplied constantly from a vehicle battery 39 mounted in the vehicle to the backup battery 32 and the power supply control circuit 33 that will be described hereinbelow. During the time power supply from the vehicle battery 39 is effected, the backup battery 32 puts its built-in capacitor on charge with use of the supplied power. Moreover, when the power supply from the vehicle battery 39 is interrupted due to a break caused for example by an accident, the backup battery 32 supplies power to the drive-recorder CPU 22 by discharging electric charges accumulated in the capacitor.

The power supply control circuit 33 is realized by the use for example of a regulator. The power supply control circuit 33 converts a voltage of for example 12 volts provided from the vehicle battery 39 into a voltage of for example 5 volts for use in driving the drive-recorder CPU 22, and supplies the converted voltage to the drive-recorder CPU 22.

In this embodiment, the drive-recorder CPU 22 corresponds to a recorder-side storage control portion and to a recorder-side acquisition portion. The nonvolatile ROM 21 and the second RAM 25 correspond to a recorder-side storage portion. The acceleration sensor 30 corresponds to an unusual-condition detection section and to an impact detection section.

Figure 3:
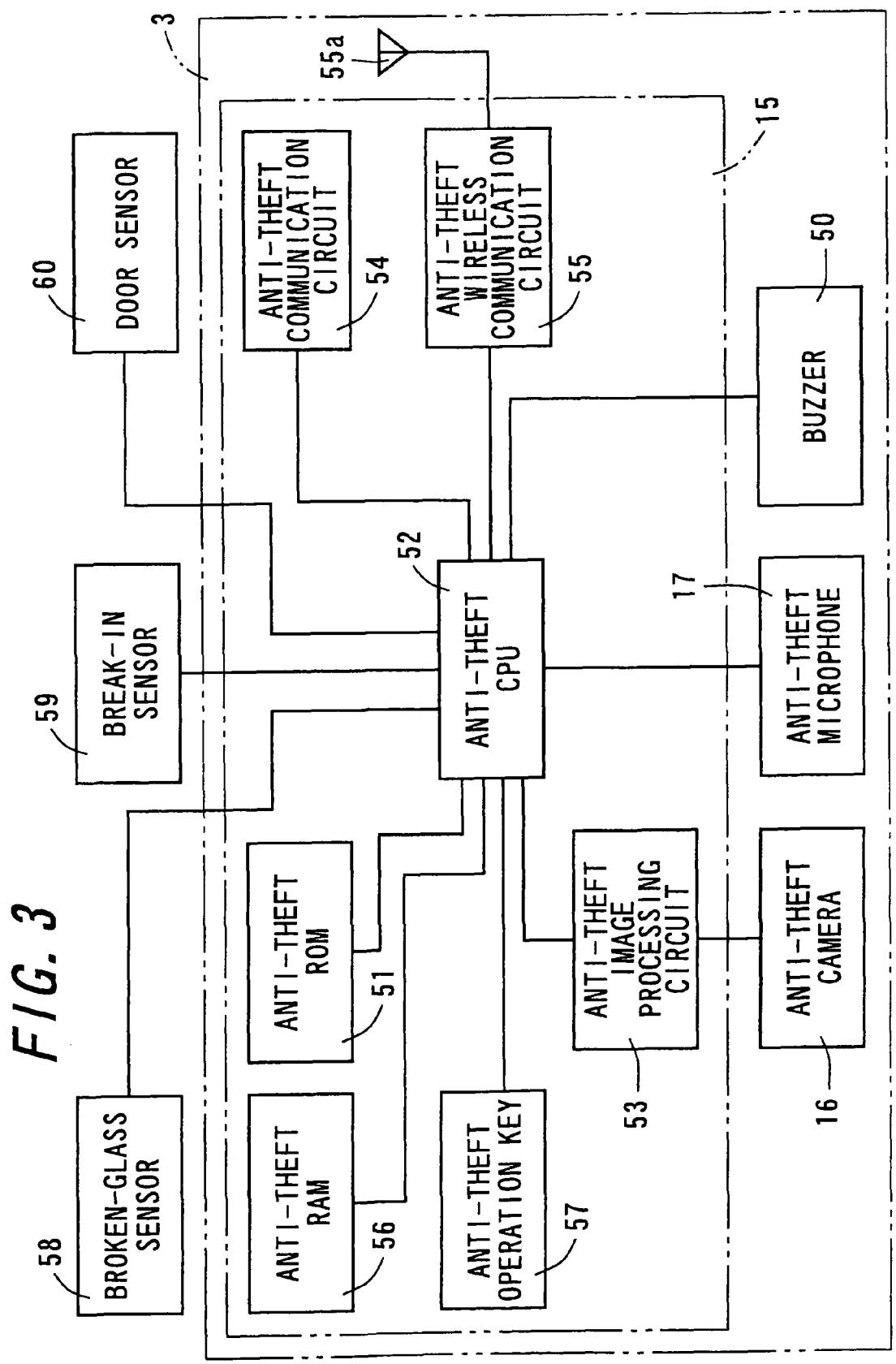
FIG. 3 is a block diagram showing the electrical configuration of an anti-theft device.

FIG. 3 is a block diagram showing the electrical configuration of the anti-theft device 3. The anti-theft device 3 includes the anti-theft device main body 15, the anti-theft camera 16, the anti-theft microphone 17, and a buzzer 50. The anti-theft device main body 15 includes an anti-theft ROM 51, the anti-theft CPU 52, an anti-theft image processing circuit 53, an anti-theft communication circuit 54, an anti-theft wireless communication circuit 55, an anti-theft RAM 56, and an anti-theft operation key 57.

The anti-theft ROM 51 is realized by the use for example of a flash ROM. The anti-theft ROM 51 stores therein a control program for exercising centralized control over hardware resources constituting the anti-theft device main body 15. Also the anti-theft ROM 51 stores therein an anti-theft ID code which is checked up against a transmitter ID (Identification) code transmitted from a transmitter 65 which will be described later.

The anti-theft CPU 52 exercises centralized control over the constituent components of the anti-theft device main body 15, namely the anti-theft ROM 51, the anti-theft image processing circuit 53, the anti-theft communication circuit 54, the anti-theft wireless communication circuit 55, the anti-theft RAM 56, and the anti-theft operation key 57 by executing the control program stored in the anti-theft ROM 51.

Connected electrically to the anti-theft CPU 52 are: the anti-theft ROM 51, the anti-theft image processing circuit 53, the anti-theft communication circuit 54, the anti-theft wireless communication circuit 55, the anti-theft RAM 56, and the anti-theft operation key 57. In addition, the anti-theft camera 16, the anti-theft microphone 17, and the buzzer 50 are electrically connected to the anti-theft CPU 52. The anti-theft camera 16 is realized by using a CCD camera. For example, the anti-theft camera 16 is disposed fixedly at a position to allow photographing of vehicle interior. The anti-theft microphone 17 is disposed at a position to allow collection of sounds in vehicle interior. Upon the anti-theft CPU 52 judging that the state of security is the alarm state, the buzzer 50 outputs a warning sound.

Also connected electrically to the anti-theft CPU 52 are: a broken-glass sensor 58 for detecting breaking of glass by noise of breaking glass in the vehicle; a break-in sensor 59 for detecting vehicle break-in by third parties other than the user by means of radio waves; and a door sensor 60 for detecting forced opening of a vehicle door. The broken-glass sensor 58, the break-in sensor 59, and the door sensor 60 each provide a detection signal indicative of the result of sensor detection to the anti-theft CPU 52.

On the basis of the detection signal issued from the broken-glass sensor 58, the anti-theft CPU 52 determines the presence or absence of detection of an unusual condition where vehicle glass has been broken. Moreover, on the basis of the detection signal issued from the break-in sensor 59, the anti-theft CPU 52 determines the presence or absence of detection of an unusual condition where third parties other than the user broke into the vehicle. Further, on the basis of the detection signal issued from the door sensor 60, the anti-theft CPU 52 determines the presence or absence of detection of an unusual condition where the door of the vehicle has been forced open by third parties other than the user.

The anti-theft image processing circuit 53 is realized by the use for example of a JPEG IC. The anti-theft image processing circuit 53 converts an image taken by the anti-theft camera 16 and inputted to the anti-theft device main body 15 into image information in JPEG format. The image, now converted into JPEG-format image information, is provided from the anti-theft image processing circuit 53 to the anti-theft CPU 52.

The anti-theft communication circuit 54 functions as a communication interface for establishing communicative connection with the drive recorder main body 10 and with the data communication device 4. The anti-theft wireless communication circuit 55 functions as a communication interface for establishing connection with the subsequently-described transmitter 65 so as to allow wireless communication with the transmitter 65 via a wireless antenna 55a.

The anti-theft RAM 56 functions as a working memory during the operation of the anti-theft device 3, and stores therein setting condition information representing which one of the alert state and the alarm state is set for the state of security in the anti-theft device 3. The anti-theft CPU 52 is capable of judging whether the state of security is set to be the alert state or the alarm state by reading the setting condition information. Note that, when the JPEG-format image information obtained through conversion by the anti-theft image processing circuit 53 and the sound information representing sounds collected by the anti-theft microphone 17 are transmitted to the drive recorder 2, the anti-theft RAM 56 may be used as a buffer for temporarily storing the information.

The anti-theft operation key 57 includes a plurality of operational input keys. By manipulating the operational input keys, it is possible to provide, to the anti-theft CPU 52, predetermined information corresponding to the key operation in the form of signals generated to represent the information such as numerical data, text data, and data on instructions to the anti-theft device 3. Accordingly, the user is allowed to input information to the anti-theft device 3 through manipulation of the operational input keys of the anti-theft operation key 57.

The anti-theft CPU 52 receives a locking command signal and an unlocking command signal transmitted from the subsequently-described transmitter 65. In response to a locking command signal or an unlocking command signal, the anti-theft CPU 52 exercises control in a manner to effect selection between a locking state where the door of the vehicle is locked under the locking command signal and an unlocking state where the door of the vehicle is unlocked under the unlocking command signal.

Upon the receipt of the transmitter ID code and the locking command signal transmitted from the subsequently-described transmitter 65 by the anti-theft wireless communication circuit 55, the anti-theft CPU 52 compares a the anti-theft ID code stored in the anti-theft ROM 51 and the received transmitter ID code. When both of them are identical with each other, the anti-theft CPU 52 effects locking of the door and setting of the state of security from a non-cautious state to the alert state. Note that, in a case where the transmitter 65 is designed to transmit security setting/resetting command signals instead of the locking/unlocking command signals, the locking control is not exercised, and only the setting or cancellation of the alert state is conducted by the anti-theft CPU 52.

The anti-theft CPU 52 determines the state of security of the vehicle, and effects transmission of the determined state of security, in this embodiment, one of the alert state and the alarm state to the drive recorder 2, via the anti-theft communication circuit 54. The anti-theft CPU 52 effects transmission of image information to the drive recorder 2 via the anti-theft communication circuit 54, the image information representing images taken by the anti-theft camera 16 and sound information representing sounds collected through the anti-theft microphone 17 at a transmission period that varies depending upon whether the state of security is the alert state or the alarm state.

Figure 4:
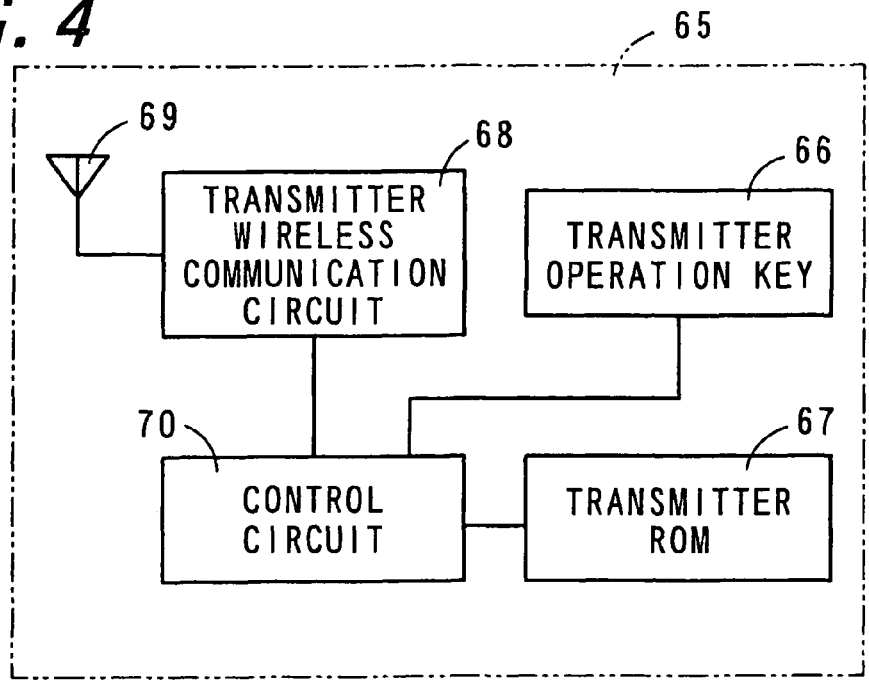
FIG. 4 is a block diagram showing the electrical configuration of a transmitter.

FIG. 4 is a block diagram showing the electrical configuration of the transmitter 65. The transmitter 65 includes a transmitter operation key 66, a transmitter ROM 67, a transmitter wireless communication circuit 68, a transmitter antenna 69, and a control circuit 70. The transmitter operation key 66 includes a plurality of operation keys. By manipulating the operation keys, it is possible to input a locking instruction for locking all of the doors of the vehicle and an unlocking instruction for unlocking all of the vehicle doors. Note that, in the absence of the locking control function, a security setting instruction and a security resetting instruction are inputted.

The transmitter ROM 67 stores therein a control program for operating the transmitter 65. Also the transmitter ROM 67 stores therein the transmitter ID code which is checked up against the anti-theft ID code stored in the anti-theft ROM 51 of the anti-theft device 3.

The transmitter wireless communication circuit 68 functions as a communication interface for establishing connection with the anti-theft device 3 so as to allow wireless communication with the anti-theft device 3 via the transmitter antenna 69.

The control circuit 70 is constructed for example of a CPU. In accordance with the control program stored in the transmitter ROM 67, the control circuit 70 exercises control of the transmitter wireless communication circuit 68 constituting the transmitter 65. Upon the input of the locking instruction or the unlocking instruction through the transmitter operation key 66, the control circuit 70 effects transmission of a locking command signal indicative of the locking instruction or an unlocking command signal indicative of the unlocking instruction to the anti-theft device 3, via the transmitter wireless communication circuit 68 and the transmitter antenna 69.

Figure 5:
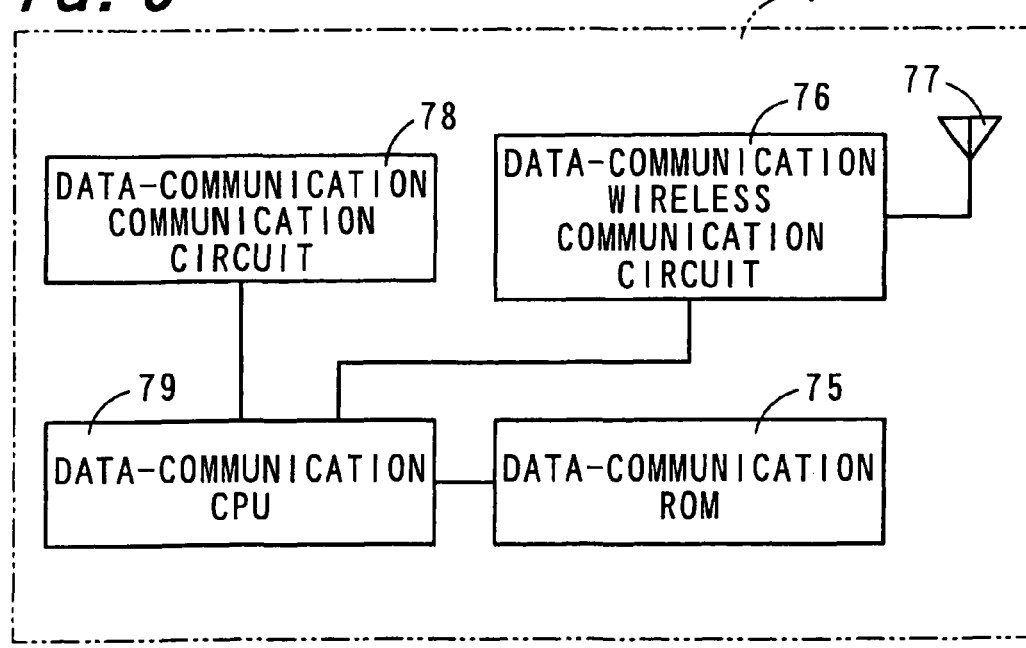
FIG. 5 is a block diagram showing the electrical configuration of a data communication device.

FIG. 5 is a block diagram showing the electrical configuration of the data communication device 4. The data communication device 4 comprises a data-communication ROM 75, a data-communication wireless communication circuit 76, a data-communication antenna 77, a data-communication communication circuit 78, and a data-communication CPU 79.

The data-communication ROM 75 stores therein a control program for operating the data communication device 4. The data-communication wireless communication circuit 76 functions as a communication interface for establishing connection with an external communication apparatus such as a portable telephone and center equipment so as to allow wireless communication with the external apparatus via the data-communication antenna 77.

The data-communication communication circuit 78 functions as a communication interface for establishing communicative connection with the drive recorder 2 and with the anti-theft device 3.

The data-communication CPU 79 exercises control over the data-communication wireless communication circuit 76 and the data-communication communication circuit 78 constituting the data communication device 4 by executing the control program stored in the data-communication ROM 75.

Upon the receipt of the image information and the sound information transmitted from the drive recorder 2 by the data-communication communication circuit 78, the data-communication CPU 79 effects transmission of the received information to the external communication apparatus via the data-communication wireless communication circuit 78 and the data-communication antenna 77.

Figure 6A:
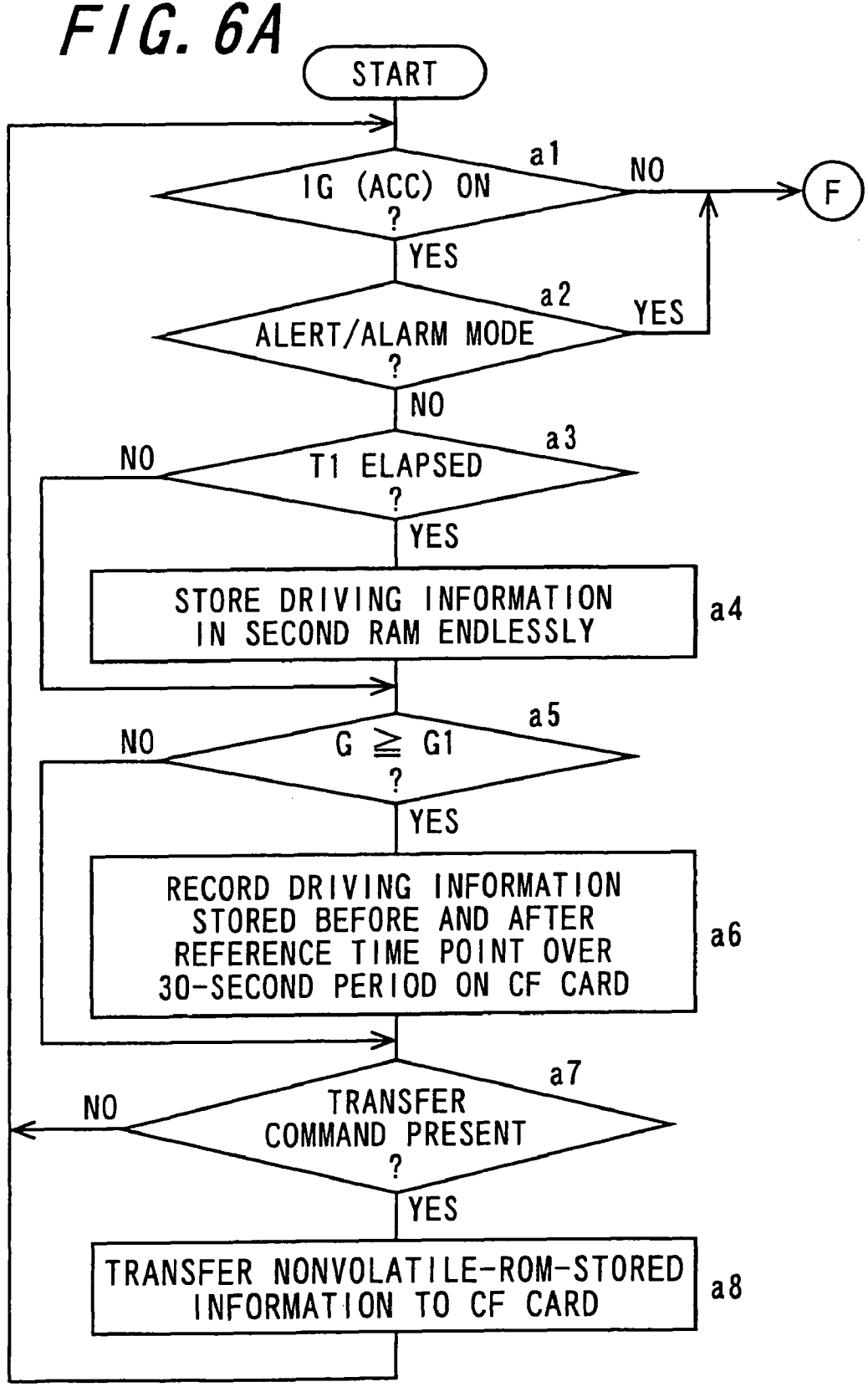
FIGS. 6A and 6B are flow charts each showing an operational procedure to be followed by a drive-recorder CPU both in a vehicle-operating state and in a vehicle-stopped state.
Figure 6B:
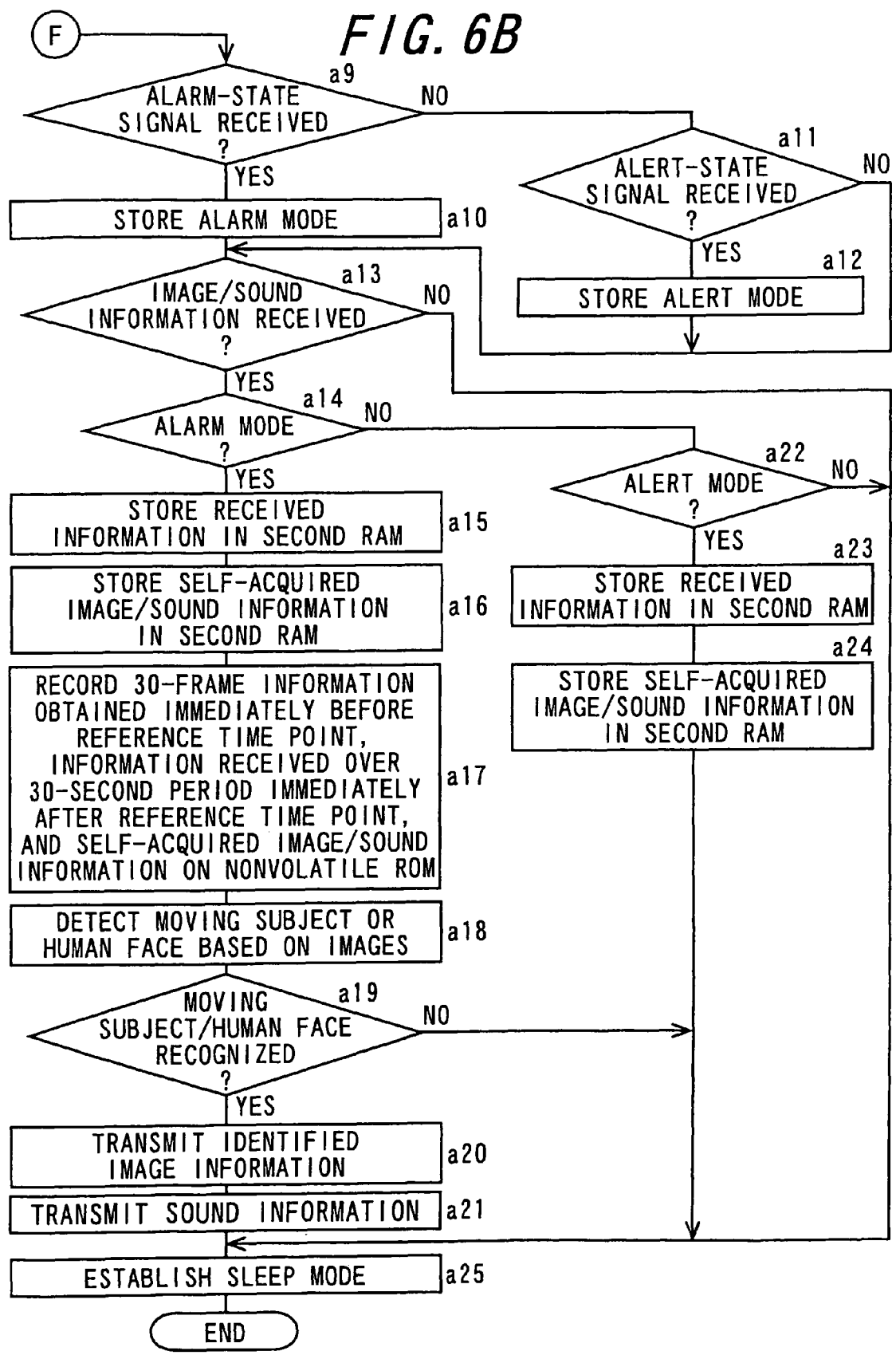

FIGS. 6A and 6B are flow charts each showing an operational procedure to be followed by the drive-recorder CPU 22 both in a vehicle-operating state and in a vehicle-stopped state. Upon the drive recorder main body 10 being connected to the vehicle battery 39, the procedure proceeds to Step a1 to start the working operation.

In Step a1, the drive-recorder CPU 22 judges whether the IG switch or the ACC switch 35 is in an ON state or not. When the IG switch or the ACC switch 35 is found to be in an ON state, it is determined that the vehicle is in an operating state, and the procedure proceeds to Step a2. When both of the IG switch and the ACC switch 35 are found to be in an OFF state, it is determined that the vehicle is in a stopped state, and the procedure proceeds to Step a9 to effect control for an anti-theft monitoring mode.

In Step a2, the drive-recorder CPU 22 judges whether an alert mode or an alarm mode has been established or not. In the second RAM 25 is stored specified mode information representing the alert mode establishment or the alarm mode establishment. The drive-recorder CPU 22 judges whether the alert mode or the alarm mode has been established or not by reading this specified mode information. In Step a2, when the drive-recorder CPU 22 determines that the alert mode or the alarm mode has been established, it is determined that the ACC switch or the IG switch has been turned on illegally by third parties other than the user, and the procedure proceeds to Step a9. When the drive-recorder CPU 22 determines that neither the alert mode nor the alarm mode has been established, it is determined that the vehicle is in motion, and the procedure proceeds to Step a3 to effect control for a driving mode.

In Step a3, the drive-recorder CPU 22 judges whether a predetermined first time interval T1 has elapsed or not. The first time interval T1 is 100 milliseconds, for example. The drive-recorder CPU 22 judges whether the predetermined first time interval T1 has elapsed or not on the basis of timekeeping data provided from its built-in real-time clock (RTC for short). When the drive-recorder CPU 22 determines in Step a3 that the predetermined first time interval T1 has elapsed, the procedure proceeds to Step a4. When the drive-recorder CPU 22 determines in Step a3 that the predetermined first time interval T1 has not elapsed, the procedure proceeds to Step a5.

In Step a4, the drive-recorder CPU 22 allows the second RAM 25 to store therein driving information in an endless manner, and the procedure proceeds to Step a5. The driving information includes for example the G-sensor output values, the vehicle-speed information, the image information, the sound information, and the vehicle-position information. The first time interval T1 refers to the interval of time at which the drive-recorder CPU 22 allows the second RAM 25 to store therein the driving information in an endless manner, namely the storage period.

In Step a5, the drive-recorder CPU 22 judges whether or not a G-sensor output value G identified on the basis of the G-sensor output-indicating signal issued from the G sensor 30 is larger than or equal to a predetermined first threshold G1. In this embodiment, the first threshold G1 is a value representing the level of detection of an impact equivalent to an accident, for example, 0.5 G. In Step a5, when the drive-recorder CPU 22 determines that the G-sensor output value G is larger than or equal to the first threshold G1, the procedure proceeds to Step a6. When the drive-recorder CPU 22 determines that the G-sensor output value G is less than the first threshold G1, the procedure proceeds to Step a7.

In Step a6, the drive-recorder CPU 22 effects recording on the CF card 38 of the driving information having been stored endlessly in the second RAM 25 before and after a reference point in time, namely the point of time at which the G-sensor output value G exceeded the first threshold G1, for 30 seconds. Then, the procedure proceeds to Step a7.

In Step a7, the drive-recorder CPU 22 determines the presence or absence of an instruction to transfer the image information and the sound information recorded on the subsequently-described nonvolatile ROM 21 to the CF card 38 (hereafter also referred to as "transfer instruction") inputted through the manipulation of a non-illustrated predetermined operation key. When it is determined in Step a7 that the transfer instruction has been inputted, the procedure proceeds to Step a8. When it is determined in Step a7 that the transfer instruction has not been inputted, the procedure returns to Step a1.

In Step a8, the drive-recorder CPU 22 effects transfer of the information recorded on the nonvolatile ROM 21 to the CF card 38. Then, the procedure returns to Step a1.

In Step a9, the drive-recorder CPU 22 judges whether or not the alarm-state signal issued from the anti-theft device 3 has been received by the drive-recorder communication circuit 29. When it is determined in Step a9 that the alarm-state signal has been received, the procedure proceeds to Step a10. When it is determined in Step a9 that the alarm-state signal has not been received, the procedure proceeds to Step a11.

In Step a10, the drive-recorder CPU 22 allows the second RAM 25 to store therein specified mode information representing that the alarm mode has been established. Upon the specified mode information representing that the alarm mode has been established being stored in the second RAM 25, the procedure proceeds to Step a13.

In Step a11, the drive-recorder CPU 22 judges whether or not the alert-state signal issued from the anti-theft device 3 has been received by the drive-recorder communication circuit 29. When it is determined in Step a11 that the alert-state signal has been received, the procedure proceeds to Step a12. When it is determined in Step a11 that the alert-state signal has not been received, the procedure proceeds to Step a13.

In Step a12, the drive-recorder CPU 22 allows the second RAM 25 to store therein specified mode information representing that the alert mode has been established. Upon the specified mode information representing that the alert mode has been established being stored in the second RAM 25, the procedure proceeds to Step a13.

In Step a13, the drive-recorder CPU 22 judges whether or not the image and sound information provided from the anti-theft device 3 has been received by the drive-recorder communication circuit 29. When it is determined in Step a13 that the image and sound information has been received, the procedure proceeds to Step a14. When it is determined in Step a13 that the image and sound information has not been received, the procedure proceeds to Step a25.

In Step a14, the drive-recorder CPU 22 judges whether the alarm mode has been established or not by reading the specified mode information stored in the second RAM 25. When it is determined in Step a14 that the alarm mode has been established, the procedure proceeds to Step a15. When it is determined in Step a14 that the alarm mode has not been established, the procedure proceeds to Step a22.

In Step a15, the drive-recorder CPU 22 allows the second RAM 25 to store therein the information received from the anti-theft device 3. Then, the procedure proceeds to Step a16. In Step a16, the drive-recorder CPU 22 allows the second RAM 25 to store therein the information of images taken by the drive recorder camera 11, now converted into JPEG-format image information, and the sound information representing sounds collected by the drive recorder microphone 12. Then, the procedure proceeds to Step a17.

In Step a17, the drive-recorder CPU 22 allows the second RAM 25 to store therein: the information on images of for example 30 frames and on sounds obtained during the time the 30 frames were taken that has been stored in the second RAM 25 immediately before a reference point in time, namely the point of time at which the determination of alarm mode establishment was made in Step a14; the information having been received from the anti-theft device 3 over a time period of 30 seconds after the reference point in time, namely the vehicle-interior images obtained by the anti-theft camera 16 and the sounds collected by the anti-theft microphone 17; and the information on images of areas ahead of the vehicle and on sounds having been acquired by the drive recorder camera 11 and the drive recorder microphone 12 over a time period of 30 seconds after the point of time at which the determination was made. Moreover, the drive-recorder CPU 22 allows the nonvolatile ROM 21 to record thereon the aforementioned pieces of information. Then, the procedure proceeds to Step a18. In this way, not only the information of vehicle-interior images but also the information of images of areas ahead of the vehicle can be stored. This makes it possible to confirm more reliably the presence or absence of an act of theft, which will hereafter be described. Note that, in a case where only the information of vehicle interior is recorded, the information obtained via the drive recorder camera 16 and the drive recorder microphone 17 does not necessarily have to be stored in the second RAM 25.

In this embodiment, In Step a17, the information on images of 30 frames and on sounds obtained during the time the 30 frames were taken that has been stored in the second RAM 25 immediately before the reference point in time is recorded on the nonvolatile ROM 21. Alternatively, the image and sound information having been stored in the second RAM 25 over a predetermined time period, for example, for 5 minutes, immediately before the alarm mode has been established can be recorded on the nonvolatile ROM 21.

The drive recorder main body 10 has a non-illustrated buffer. In the drive recorder main body 10, the information on images of areas ahead of the vehicle and on sounds acquired by the drive recorder camera 11 and the drive recorder microphone 12 is stored in the second RAM 25 as follows. The drive-recorder CPU 22 allows the buffer to store therein the sound information is continuously, and allows the second RAM 25 to store therein the sound information having been stored in the buffer during the time interval between the previous storage of the image information and the forthcoming storage of the image information in correspondence with the image information with a timing for storing the image information in the second RAM 25. For example, in a case where the image information is stored at each of specific times: t1 through tn (n represents a natural number of 2 or more), in correspondence with the image information stored at a time tk (k represents an integer of 2 or more), the sound information having been stored in the buffer during the time interval between the time tk−1 and the time tk is stored in the second RAM 25.

In Step a17 thus far described, the sound information stored in the second RAM 25 in correspondence with the image information is stored in the nonvolatile ROM 21 in the form of sound file. That is, in a case where the image information stored in the second RAM 25 at each of the times t1 to tk is recorded on the nonvolatile ROM 21, the information of sounds obtained continuously from the time t1 to the time tk is recorded on the nonvolatile ROM 21 in the form of sound file. Note that the operation for sound information storage in the anti-theft device 3 is conducted basically in the same manner as in the drive recorder main body 10, and therefore the description thereof will be omitted.

In Step a18, the drive-recorder CPU 22 detects moving subjects or human faces on the basis of the image information recorded on the nonvolatile ROM 21 in Step a17. The detection of moving subjects is effected as follows. For example, the drive-recorder CPU 22 derives a difference between two images obtained at predetermined different points of time, and detects the presence or absence of a moving subject on the basis of the derivation result. More specifically, the drive-recorder CPU 22 derives a differential between a pixel value for the position of one of the two images and a pixel value for the position of the other image, and accumulates derived differential values. When the cumulative sum value is larger than a predetermined threshold, it is determined that a moving subject has been detected. When the cumulative sum value is smaller than the threshold, it is determined that there is no moving subject. Note that how to detect a moving subject is not limited to the method suggested hereinabove, but may be of another method. On the other hand, the detection of human faces is effected as follows. For example, the drive-recorder CPU 22 conducts image edge detection and compares the detection result and a predetermined pattern. Then, the degree of analogy between them is obtained thereby to detect the presence or absence of a human face. Note that how to detect a human face is not limited to the method suggested hereinabove, but may be of another method.

In Step a19, the drive-recorder CPU 22 judges whether the moving subject or human face detected in Step a18 has been recognized or not. When it is determined that the moving subject or human face has been recognized, the procedure proceeds to Step a20. When it is determined that the moving subject or human face has not been recognized, the procedure proceeds to Step a25.

In Step a20, the drive-recorder CPU 22 effects identification of image information including the moving subject or human face recognized in Step a19 out of the image information recorded on the nonvolatile ROM 21, and effects transmission of the identified image information to the data communication device 4 via the drive-recorder communication circuit 29. Then, the procedure proceeds to Step a21.

In Step a21, the drive-recorder CPU 22 effects transmission of the sound information recorded on the nonvolatile ROM 21 in Step a17 to the data communication device 4 via the drive-recorder communication circuit 29. Then, the procedure proceeds to Step a25.

In Step a22, the drive-recorder CPU 22 judges whether the alert mode has been established or not by reading the specified mode information stored in the second RAM 25. When it is determined in Step a22 that the alert mode has been established, the procedure proceeds to Step a23. When it is determined in Step a22 that the alert mode has not been established, the procedure proceeds to Step a25.

In Step a23, just as is the case with the process in Step a15 described previously, the drive-recorder CPU 22 allows the second RAM 25 to store therein the information received from the anti-theft device 3. Then, the procedure proceeds to Step a24. In Step a24, just as is the case with the process in Step a16 described previously, the drive-recorder CPU 22 allows the second RAM 25 to store therein the information of images taken by the drive recorder camera 11, now converted into JPEG-format image information, and the sound information representing sounds collected by the drive recorder microphone 12. Then, the procedure proceeds to Step a25.

In Step a25, the drive-recorder CPU 22 effects establishment of a sleep mode, and the whole working operation comes to an end. In the sleep mode, the number of parts constituting the drive recorder main body 10 under the supply of power is limited, and the operation clock of the drive-recorder CPU 22 is brought to a halt. Upon the establishment of the sleep mode, the power supply control circuit 33 exercises control in a manner to supply power only to predetermined parts of the drive recorder main body 10. In the sleep-mode state, in contrast to a state prior to the establishment of the sleep mode, it is possible to cut power consumption in the drive recorder main body 10. In the drive recorder 2 of this embodiment, even in the sleep-mode state, driving power can be supplied at least to part of the drive-recorder CPU 22 and the drive-recorder communication circuit 29. Accordingly, the drive recorder 2 is so designed that, under the sleep-mode state, the alert-state signal or the alarm-state signal transmitted from the anti-theft device 3 can be received by the drive-recorder communication circuit 29, and whether the alert-state signal or the alarm-state signal has been received or not can be judged by the drive-recorder CPU 22.

As described heretofore, according to the first embodiment, in Step a17 of the flow chart shown in FIG. 6B, the drive-recorder CPU 22 allows the nonvolatile ROM 21 to record thereon the information on images of 30 frames and on corresponding sounds acquired immediately before the reference point in time, namely the point of time at which the determination of alarm mode establishment was made in Step a14, the information having been received from the anti-theft device 3 over a time period of 30 seconds after the reference point in time and stored in the second RAM 25, and the image and sound information having been acquired by the drive recorder camera 11 and the drive recorder microphone 12 over a time period of 30 seconds after the point of time at which the determination was made and stored in the second RAM 25. Moreover, when it is determined in Step a7 that the transfer instruction has been inputted, the image and sound information recorded on the nonvolatile ROM 21 is transferred to the CF card 38 in Step a8. The information received from the anti-theft device 3 and the image and sound information stored in the second RAM 25 may be transferred to and recorded directly on the CF card 38 without being recorded on the nonvolatile ROM 21. However, with such a configuration, there is a possibility that the CF card 38 on which is recorded the information is drawn out by third parties other than the user, and eventually the information about theft recorded thereon per se could be stolen.

In this regard, according to this embodiment, as described above, the image and sound information recorded on the nonvolatile ROM 21 is transferred to the CF card 38 only when the transfer instruction is inputted. With this configuration, the recorded theft information per se can be prevented from being stolen by third parties other than the user.

In this embodiment, in Steps a17 through a20 of the flow chart shown in FIG. 6B, the drive-recorder CPU 22 is so configured as to detect a moving subject or human face on the basis of the image information recorded on the nonvolatile ROM 21, and identify specific pieces of image information including the moving subject or human face, and then effect transmission of the identified image information and the corresponding sound information recorded on the nonvolatile ROM 21 to the data communication device 4. However, the invention is not limited to such a configuration. In another embodiment of the invention, the moving subject- or human face-detecting operation is omitted. That is, the procedure proceeds to Step a20 in lieu of Step a18. In this case, the drive-recorder CPU 22 may be so configured as to effect transmission to the data communication device 4 via the drive-recorder communication circuit 29, of the information on images of a predetermined number of frames acquired immediately before a shift to the alarm mode, and also the information having been received from the anti-theft device 3 over a time period of 30 seconds after the point of time at which the determination of alarm mode establishment was made and stored in the second RAM 25 and the image and sound information having been acquired by the drive recorder camera 11 and the drive recorder microphone 12 over a time period of 30 seconds after the point of time at which the determination was made and stored in the second RAM 25.

Figure 7:
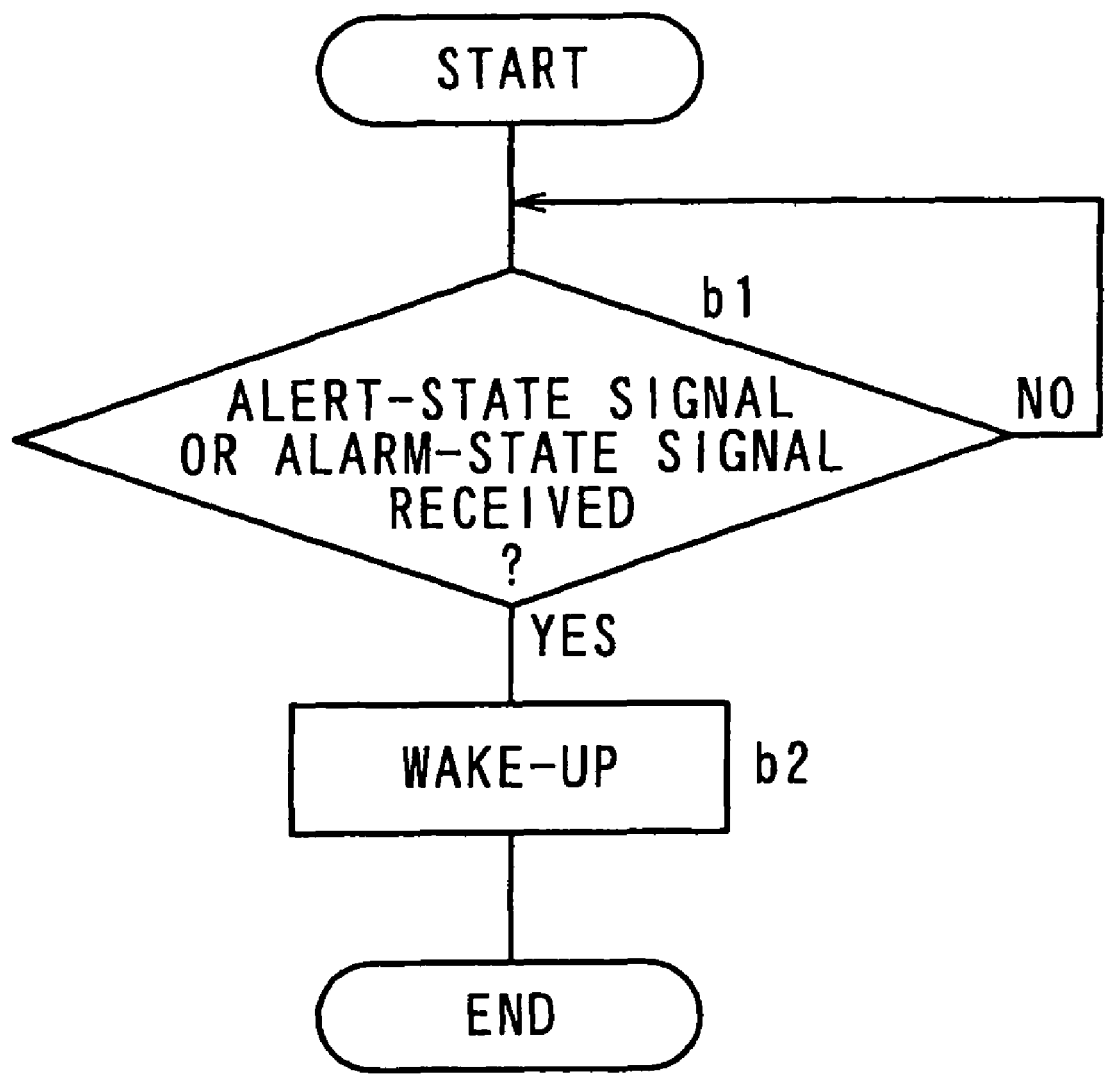
FIG. 7 is a flow chart showing a wakeup-related operational procedure to be followed by the drive-recorder CPU.

FIG. 7 is a flow chart showing a wakeup-related operational procedure to be followed by the drive-recorder CPU 22. Upon the establishment of the sleep mode under the control of the drive-recorder CPU 22, the procedure proceeds to Step b1 to start the working operation.

In Step b1, the drive-recorder CPU 22 judges whether or not a signal indicative of an anti-theft mode condition, such as the alert-state signal or the alarm-state signal transmitted from the anti-theft device 3, or an image/sound signal has been received by the drive-recorder communication circuit 29. When the reception is determined, the procedure proceeds to Step b2. When the reception is not determined, the system is placed in a standby condition until the reception is confirmed.

In Step b2, the drive-recorder CPU 22 effects wake-up in response to an interrupt signal which is inputted at the time of reception of the alert-state signal, the alarm-state signal, or the image/sound signal in Step b1. Then, predetermined process steps are carried out in the same manner as in the state prior to the establishment of the sleep mode, and thereafter the working operation comes to an end. The "predetermined process steps" refer to the process steps of the flow charts shown in FIGS. 6A and 6B.

As has already been described, in the first embodiment, the sleep mode is established when the vehicle is in a stopped state. In response to reception interruption that occurs every time a signal transmitted from the anti-theft device 3 is received, the drive-recorder CPU 22 effects wake-up, and the above-described process steps in Steps a1 and a9 to a24 of FIGS. 6A and 6B are conducted. After that, the sleep mode is established once again. Accordingly, in the drive recorder 2, there is no need for the drive-recorder CPU 22 to be constantly kept in a wakeup-effecting state to perform the predetermined process steps during the halt of the vehicle. Only when the alert-state signal, the alarm-state signal, or the image/sound signal is received from the anti-theft device 3, the drive-recorder CPU 22 effects wake-up to perform the predetermined process. Therefore, during the halt of the vehicle, in contrast to the case where the drive-recorder CPU 22 is constantly kept in a wakeup-effecting state, it is possible to cut power consumption in the information storage apparatus 1. It is also possible to avoid running out of the vehicle battery 39 during the halt of the vehicle.

Figure 8:
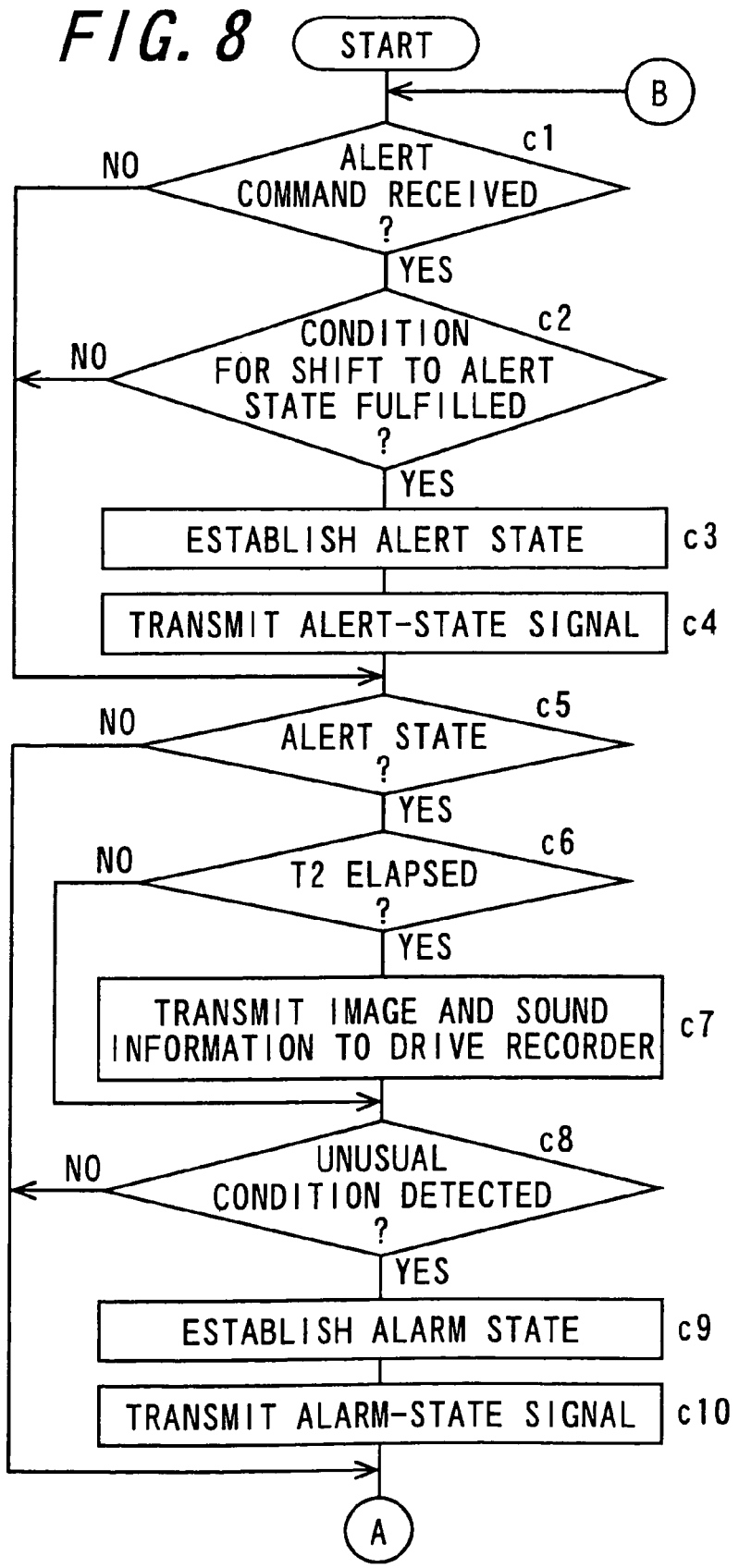
FIG. 8 is a flow chart showing an operational procedure to be followed by an anti-theft CPU.
Figure 9:
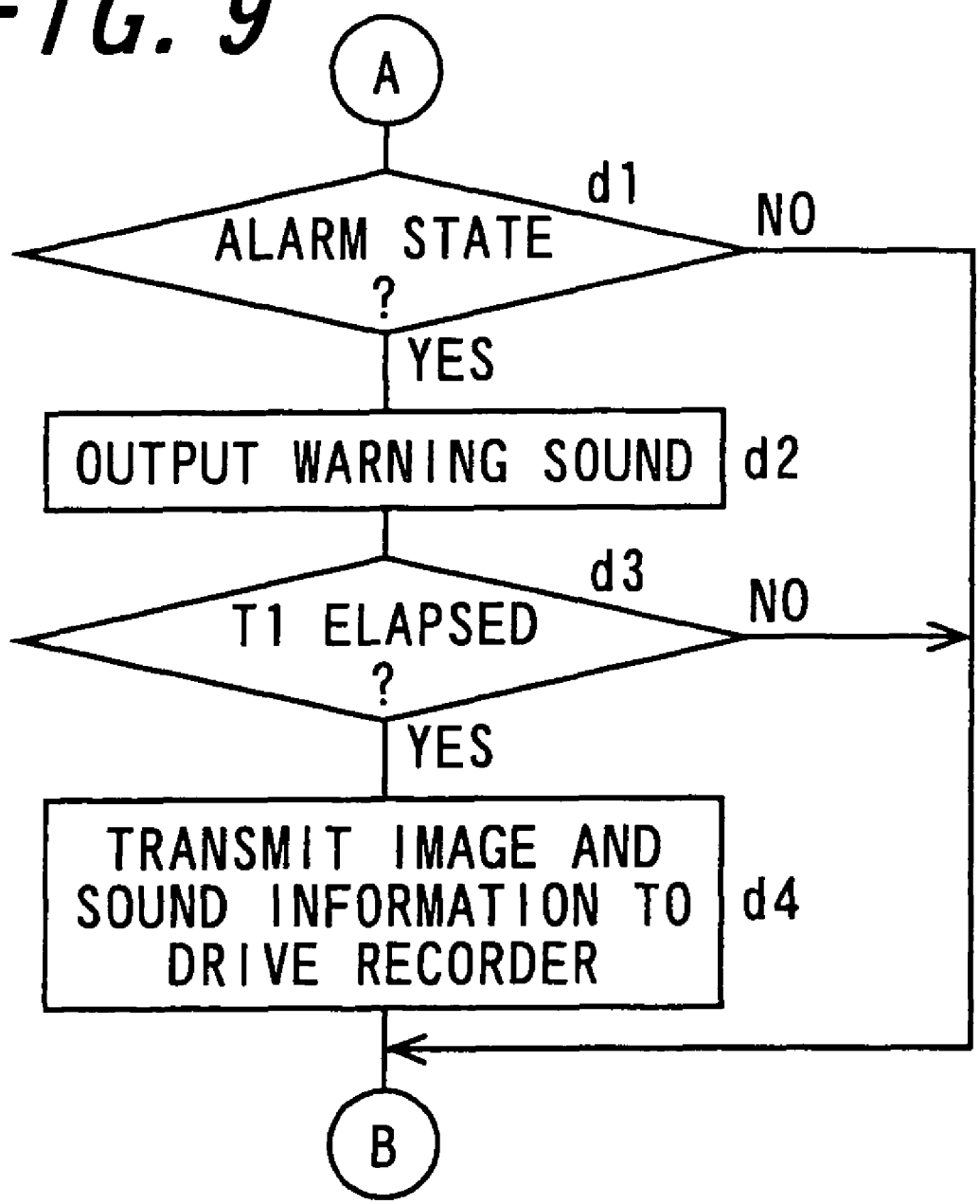
FIG. 9 is a flow chart showing an operational procedure to be followed by the anti-theft CPU.

FIGS. 8 and 9 are flow charts each showing an operational procedure to be followed by the anti-theft CPU 52. Under a condition of setting the anti-theft CPU 52 in motion by turning the power on, the procedure proceeds to Step c1 to start the working operation.

In Step c1, the anti-theft CPU 52 judges whether or not an alert command transmitted from the transmitter 65 has been received by the anti-theft wireless communication circuit 55. When it is determined in Step c1 that the alert command has been received, the procedure proceeds to Step c2. When it is determined in Step c1 that the alert command has not been received, the procedure proceeds to Step c5. To be specific, the alert command transmitted from the transmitter 65 refers to the locking command signal or the security setting command signal transmitted from the transmitter 65.

In Step c2, the anti-theft CPU 52 judges whether a condition for a shift to the alert state has been fulfilled or not. The condition for a shift to the alert state is for example the closing and locking of all of the doors of the vehicle. When the anti-theft CPU 52 determines in Step c2 that the condition for a shift to the alert state has been fulfilled, the procedure proceeds to Step c3. When the anti-theft CPU 52 determines in Step c2 that the condition for a shift to the alert state has not been fulfilled, the procedure proceeds to Step c5.

In Step c3, the anti-theft CPU 52 effects setting of the state of security to the alert state, and allows the anti-theft RAM 56 to store therein setting condition information representing the establishment of the alert state. Then, the procedure proceeds to Step c4. In Step c4, the anti-theft CPU 52 effects transmission of an alert-state signal indicating that the anti-theft device 3 is placed in the alert state to the drive recorder 2, via the anti-theft communication circuit 54. Then, the procedure proceeds to Step c5.

In Step c5, the anti-theft CPU 52 judges whether the alert state has been established or not by reading the setting condition information stored in the anti-theft RAM 56. When the anti-theft CPU 52 determines in Step c5 that the alert state has been established, the procedure proceeds to Step c6. When the anti-theft CPU 52 determines in Step c5 that the alert state has not been established, the procedure proceeds to Step d1 shown in FIG. 9.

In Step c6, the anti-theft CPU 52 judges whether a predetermined second time interval T2 has elapsed or not. The second time interval T2 is 1 minute, for example. The second time interval T2 is set to be longer than the first time interval T1 that is the interval of time at which the drive-recorder CPU 22 allows the second RAM 25 to store therein the driving information endlessly when the vehicle is in an operating state. The anti-theft CPU 52 judges whether the predetermined second time interval T2 has elapsed or not on the basis of time-keeping data provided from its built-in RTC. When the anti-theft CPU 52 determines in Step c6 that the predetermined second time interval T2 has elapsed, the procedure proceeds to Step c7. When the anti-theft CPU 52 determines in Step c6 that the predetermined second time interval T2 has not elapsed, the procedure proceeds to Step c8.

In Step c7, the anti-theft CPU 52 effects transmission of the information of images taken by the anti-theft camera 16, now converted into JPEG-format image information, and the sound information representing sounds collected by the anti-theft microphone 17 to the drive recorder 2, via the anti-theft communication circuit 54. Then, the procedure proceeds to Step c8. The second time interval T2 refers to the interval of time at which the anti-theft CPU 52 effects transmission of the information of images taken by the anti-theft camera 16, now converted into JPEG-format image information, and the sound information representing sounds collected by the anti-theft microphone 17 to the drive recorder 2, namely the transmission period. In the following description, "the second time interval T2" is also referred to as "the second transmission period T2".

In Step c8, on the basis of detection signals issued from the broken-glass sensor 58, the break-in sensor 59, and the door sensor 60, respectively, the anti-theft CPU 52 judges whether or not occurrence of something unusual in the vehicle, such as breaking of vehicle glass, vehicle break-in by third parties other than the user, and forced opening of vehicle doors by third parties other than the user, namely an act of theft, has been detected. When the anti-theft CPU 52 determines in Step c8 that unusual vehicle conditions have been detected, the procedure proceeds to Step c9. When the anti-theft CPU 52 determines in Step c8 that no unusual vehicle condition has been detected, the procedure proceeds to Step d1 shown in FIG. 9.

In Step c9, the anti-theft CPU 52 effects setting of the state of security to the alarm state, and allows the anti-theft RAM 56 to store therein setting condition information representing the establishment of the alarm state. Then, the procedure proceeds to Step c10. In Step c10, the anti-theft CPU 52 effects transmission of an alarm-state signal indicating that the anti-theft device 3 is placed in the alarm state to the drive recorder 2, via the anti-theft communication circuit 54. Then, the procedure proceeds to Step d1 shown in FIG. 9.

In Step d1 shown in FIG. 9, the anti-theft CPU 52 judges whether the alarm state has been established or not by reading the setting condition information stored in the anti-theft RAM 56. When the anti-theft CPU 52 determines in Step d1 that the alarm state has been established, the procedure proceeds to Step d2. When the anti-theft CPU 52 determines in Step d1 that the alarm state has not been established, the procedure returns to Step c1 shown in FIG. 8.

In Step d2, the anti-theft CPU 52 allows the buzzer 50 to output a warning sound for a predetermined period of time, for example, 30 seconds. Then, the procedure proceeds to Step d3. In Step d3, the anti-theft CPU 52 judges whether a predetermined first time interval T1 has elapsed or not. The predetermined first time interval T1 is identical with the interval of time at which the drive-recorder CPU 22 allows the second RAM 25 to store therein the driving information endlessly; that is, 100 milliseconds. When the anti-theft CPU 52 determines in Step d3 that the predetermined first time interval T1 has elapsed, the procedure proceeds to Step d4. When the anti-theft CPU 52 determines in Step d3 that the predetermined first time interval T1 has not elapsed, the procedure returns to Step c1 shown in FIG. 8.

In Step d4, the anti-theft CPU 52 effects transmission of the information of images taken by the anti-theft camera 16, now converted into JPEG-format image information, and the sound information representing sounds collected by the anti-theft microphone 17 to the drive recorder 2, via the anti-theft communication circuit 54. Then, the procedure returns to Step c1 shown in FIG. 8. The first time interval T1 refers to the interval of time at which the anti-theft CPU 52 effects transmission of the information of images taken by the anti-theft camera 16, now converted into JPEG-format image information, and the sound information representing sounds collected by the anti-theft microphone 17 to the drive recorder 2, namely the transmission period. In the following description, "the first time interval T1" is also referred to as "the first transmission period T1".

In Steps d3 and d4 of the flow chart shown in FIG. 9, the interval of time at which the image and sound information is transmitted to the drive recorder 2 under the alarm state is defined as the first time interval T1 which is identical with the interval of time at which the drive-recorder CPU 22 allows the second RAM 25 to store therein the driving information endlessly. However, the interval of time for transmission is not limited to the first time interval T1, but may be of another time interval. In this regard, preferably, the interval of time at which the image and sound information is transmitted to the drive recorder 2 under the alarm state is set to be larger than or equal to the first time interval T1 but smaller than the second time interval T2. That is, if a time interval close to the first time interval T1 is adopted, the continuity of images is improved, wherefore how a wrongdoing is being committed can be grasped more reliably. However, the negative side is that the amount of power to be consumed is increased. On the other hand, if a time interval close to the second time interval T2 is adopted, the reverse to the above-described consequences will come about. Accordingly, the interval of time related to Step d3 is determined from the standpoints of both power consumption and grasp of wrongdoings.

As described heretofore, according to the first embodiment, during the halt of the vehicle, at least one of image information and sound information about vehicle interior is acquired by the anti-theft CPU 52 of the anti-theft device 3. The information acquired by the anti-theft CPU 52 is transmitted, via the anti-theft communication circuit 54, to the drive recorder 2 under the control of the anti-theft CPU 52 at a transmission period that varies between before and after the detection of unusual vehicle conditions by the anti-theft CPU 52. More specifically, under the alert state prior to the detection of unusual vehicle conditions, the information acquired by the anti-theft CPU 52 is transmitted to the drive recorder 2 at the predetermined second transmission period T2. On the other hand, under the alarm state subsequent to the detection of unusual vehicle conditions, the information acquired by the anti-theft CPU 52 is transmitted to the drive recorder 2 at the predetermined first transmission period T1 which is different from and shorter than the predetermined second transmission period T2.

The drive-recorder CPU 22 of the drive recorder 2 allows the second RAM 25 to store therein the information received from the anti-theft device 3 at the second transmission period T2 and the information received from the anti-theft device 3 at the first transmission period T1 at different storage periods. That is, under the alert state, since occurrence of an act of theft is unpredictable in advance, photographing is carried out at a relatively long interval of time, and resultant information is stored in the second RAM 25. In this way, energy saving can be achieved. On the other hand, under the alarm state, since an act of theft is actually happening, photographing is carried out at a short interval of time to record the crime situation without fail, and resultant information is stored in the second RAM 25. At the same time, the information having been stored in the second RAM 25, at a relatively long interval of time, for a predetermined period of time immediately before a reference point in time, namely the point of time at which the theft occurred, and the information having been stored in the second RAM 25, at a short interval of time, for a predetermined period of time immediately after the reference point in time are recorded on the nonvolatile ROM 21.

Accordingly, the information of the situation before and after the moment of occurrence of a theft can be recorded on the nonvolatile ROM 21 with lesser amount of power to be consumed. Moreover, in a case where there is a certain limit to the storage capacity of the nonvolatile ROM 21 of the drive recorder, the interval of time at which the information acquired by the anti-theft CPU 52 before and after the moment of detection of unusual vehicle conditions is transmitted to the drive recorder, expressed differently, the interval of time for storing the information in the nonvolatile ROM 21 of the drive recorder 2, is selectable in an appropriate manner. This makes it possible for the information on vehicle interior acquired by the anti-theft CPU 52 of the anti-theft device 3 before and after the moment of detection of unusual vehicle conditions to be recorded on the nonvolatile ROM 21 without fail.

Next, a description will be given below as to an image storage apparatus in accordance with a second embodiment of the invention. The image storage apparatus of the second embodiment is identical in configuration with the image storage apparatus 1 of the preceding first embodiment. Therefore, the components that play the same or corresponding roles as in the image storage apparatus 1 will be identified with the same reference symbols, and overlapping descriptions will be omitted.

In the first embodiment, the anti-theft device 3 is devoid of a G sensor. Thus, in the second embodiment, the G sensor 30 disposed in the drive recorder 2 is utilized for the detection of an act of theft during the halt of the vehicle.

Figure 10:
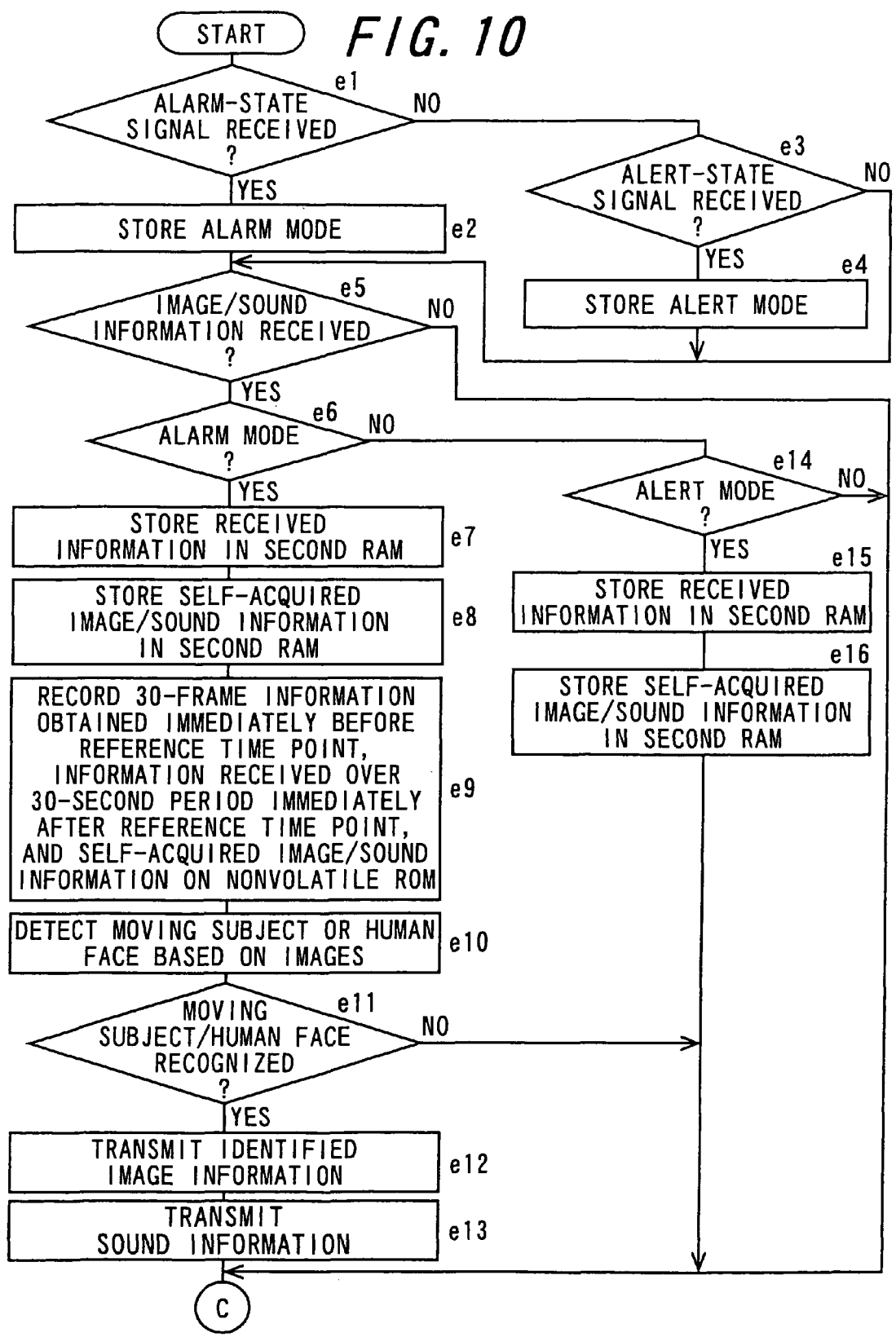
FIG. 10 is a flow chart showing an operational procedure to be followed by the drive-recorder CPU in a vehicle-stopped state.

FIGS. 10 and 11 are flow charts each showing an operational procedure to be followed by the drive-recorder CPU 22 in a vehicle-stopped state. When the IG switch or the ACC switch 35 is turned off, the procedure proceeds to Step e1 to start the working operation. Note that, when the IG switch or the ACC switch 35 is turned on, the process steps in Steps a2 through a8 shown in FIG. 6A are performed.

The process steps in Steps e1 through e16 shown in the flow chart of FIG. 10 to be followed by the drive-recorder CPU 22 are the same as those in Steps a9 through a24 shown in the flow chart of FIG. 6B to be followed by the drive-recorder CPU 22, respectively, and therefore the description thereof will be omitted. When the drive-recorder CPU 22 determines in Step e5 that the image and sound information transmitted from the anti-theft device 3 has not been received, when the drive-recorder CPU 22 determines in Step e11 that neither moving subject nor human face has been recognized, and when the process step in Step e13 or Step e16 is over, the procedure proceeds to Step f1 shown in the flow chart of FIG. 11.

In Step f1, the drive-recorder CPU 22 judges whether or not a G-sensor output value G identified on the basis of the G-sensor output-indicating signal issued from the G sensor 30 is larger than or equal to a predetermined second threshold G2. In this embodiment, the second threshold G2 is a value representing the level of theft detection, for example, 0.1 G. However, the second threshold G2 is not limited to 0.1 G, but may be of any given value so long as it is smaller than or equal to the first threshold G1 representing the level of detection of an impact equivalent to an accident. In Step f1, when the drive-recorder CPU 22 determines that the G-sensor output value is larger than or equal to the second threshold, the procedure proceeds to Step f2. When the drive-recorder CPU 22 determines that the G-sensor output value is less than the second threshold, the procedure proceeds to Step f5.

In Step f2, the drive-recorder CPU 22 judges whether the alert mode has been established or not by reading the specified mode information stored in the second RAM 25. When it is determined in Step f2 that the alert mode has been established, the procedure proceeds to Step f3. When it is determined in Step f2 that the alert mode has not been established, the procedure proceeds to Step f5.

In Step f3, the drive-recorder CPU 22 determines that something unusual such as an act of theft is happening, and allows the second RAM 25 to store therein specified mode information representing that the alarm mode is established. Upon the specified mode information representing that the alarm mode is established being stored in the second RAM 25, the procedure proceeds to Step f4.

In Step f4, the drive-recorder CPU 22 effects transmission of a transmission-period shortening command signal to the anti-theft device 3 via the drive-recorder communication circuit 29, the transmission-period shortening command signal being indicative of an instruction to shorten the interval of time at which the information of images taken by the anti-theft camera 16, now converted into JPEG-format image information, and the sound information representing sounds collected by the anti-theft microphone 17 are transmitted to the drive recorder 2. Then, the procedure proceeds to Step f5.

In Step f5, a sleep mode is established under the control of the drive-recorder CPU 22, and the whole working operation comes to an end. In the drive recorder 2 of this embodiment, even under the sleep mode, driving power is supplied to at least part of the drive-recorder CPU 22. That is, the drive recorder 2 is so designed that, under the sleep mode, a signal indicative of the G-sensor output value outputted from the G sensor 30 (hereafter referred to as "G-sensor output signal") is receivable, and whether the G-sensor output signal has been received or not can be judged by the drive-recorder CPU 22.

FIG. 12 is a flow chart showing a wakeup-related operational procedure to be followed by the drive-recorder CPU 22. Upon the establishment of the sleep mode under the control of the drive-recorder CPU 22, the procedure proceeds to Step g1 to start the working operation.

In Step g1, the drive-recorder CPU 22 judges whether the G-sensor output signal issued from the G sensor 30 has been received or not. When the reception is determined, the procedure proceeds to Step g2. When the reception is not determined, the system is placed in a standby condition until the reception is confirmed.

In Step g2, the drive-recorder CPU 22 effects wake-up in response to an interrupt signal which is inputted at the time of reception of the G-sensor output signal in Step g1. Then, predetermined process-steps are carried out in the same manner as in the state prior to the establishment of the sleep mode, and thereafter the working operation comes to an end. The "predetermined process steps" refer to the process steps of the flow chart shown in FIG. 10. Note that, in regard to the wake-up process, the process corresponding to FIG. 7 is also carried out concurrently.

As has already been described, in the second embodiment, the sleep mode is established when the vehicle is in a stopped state. Every time the G-sensor output signal issued from the G sensor 30 is received, or every time a signal transmitted from the anti-theft device 3 is received, the drive-recorder CPU 22 effects wake-up, and the above-described process steps in Steps e2 to e3 and e5 through e15 are conducted. After that, the sleep mode is established once again. Accordingly, in the drive recorder 2, there is no need for the drive-recorder CPU 22 to be constantly kept in a wakeup state to perform the predetermined process steps during the halt of the vehicle. Only when the G-sensor output signal outputted from the G sensor 30 or the signal issued from the anti-theft device 3 is received, the drive-recorder CPU 22 effects wake-up to perform the predetermined process steps. Therefore, during the halt of the vehicle, in contrast to the case where the drive-recorder CPU 22 is constantly kept in a wakeup-effecting state, it is possible to cut power consumption in the information storage apparatus 1. It is also possible to avoid running out of the vehicle battery 39 during the halt of the vehicle.

FIGS. 13 and 14 are flow charts each showing an operational procedure to be followed by the anti-theft CPU 52. Under a condition of setting the anti-theft CPU 52 in motion by turning the power on, the procedure proceeds to Step h1 to start the working operation.

In Step h1, the anti-theft CPU 52 judges whether or not the transmission-period shortening command signal transmitted from the drive recorder 2 has been received by the anti-theft communication circuit 54. When it is determined in Step h1 that the transmission-period shortening command signal has been received; that is, it is determined that something unusual such as an act of theft is happening on the basis of the output from the G sensor 30, the procedure proceeds to Step h2. When it is determined in Step h1 that the transmission-period shortening command signal has not been received, the procedure proceeds to Step h13.

In Step h2, the anti-theft CPU 52 effects change of the interval of time at which the information of images taken by the anti-theft camera 16, now converted into JPEG-format image information, and the sound information representing sounds collected by the anti-theft microphone 17 are transmitted to the drive recorder 2, from the second transmission period T2 to the first transmission period T1 which is shorter in period than the second transmission period T2. Then, the procedure proceeds to Step h3. In this embodiment, the second transmission period T2 is 1 minute, and the first transmission period T1 is 100 milliseconds.

The process steps in Steps h3 through h7 and Steps h9 through h12 are the same as those in Steps c1 through c5 and Steps c7 through c10 of the flow chart shown in FIG. 8, respectively, and therefore the description thereof will be omitted. When the anti-theft CPU 52 determines in Step h7 that the alert state has been established, the procedure proceeds to Step h8.

In Step h8, unlike the judgment process in Step c6 of the flow chart shown in FIG. 8, the anti-theft CPU 52 judges whether the first transmission period T1, namely the first time interval T1, with which the second transmission period T2 is replaced in Step h2, has elapsed or not. The anti-theft CPU 52 judges whether the first time interval T1 has elapsed or not on the basis of time-keeping data provided from its built-in RTC. When the anti-theft CPU 52 determines in Step h8 that the first time interval T1 has elapsed, the procedure proceeds to Step h9 to perform a process step similar to the above-described process step in Step c7 shown in FIG. 8. When the anti-theft CPU 52 determines in Step h8 that the first time interval T1 has not elapsed, the procedure proceeds to Step h10 to perform a process step similar to the above-described process step in Step c8 shown in FIG. 8. Note that, in Step h10, the reception of the transmission-period shortening command in Step h1 is also regarded as the detection of unusual conditions. In consequence, the result of determination in Step h10 is invariably "YES".

When the anti-theft CPU 52 determines in Step h7 that the alert state has not been established, when the anti-theft CPU 52 determines in Step h10 that no unusual vehicle condition has been detected, and when the transmission of the alarm-state signal indicating that the anti-theft device 3 is placed in the alarm state to the drive recorder 2 is over under the control of the anti-theft CPU 52 in Step h12, the procedure proceeds to Step k1 of the flow chart shown in FIG. 14.

The process steps in Steps h13 through h22 are the same as those in Steps c1 through c10 of the flow chart shown in FIG. 8, respectively, and therefore the description thereof will be omitted. When the anti-theft CPU 52 determines in Step h17 that the alert state has not been established, when the anti-theft CPU 52 determines in Step h20 that no unusual vehicle condition has been detected on the basis of the output from each of the sensors 58, 59, and 60 disposed in the anti-theft device 3, and when the transmission of the alarm-state signal indicating that the anti-theft device 3 is placed in the alarm state to the drive recorder 2 is over under the control of the anti-theft CPU 52 in Step h22, the procedure proceeds to Step k1 of the flow chart shown in FIG. 14.

The process steps in Steps k1 through k4 are the same as those in Steps d1 through d4 of the flow chart shown in FIG. 9, respectively, and therefore the description thereof will be omitted. When the anti-theft CPU 52 determines in Step k1 that the alarm state has not been established, when the anti-theft CPU 52 determines in Step k3 that the predetermined first time interval T1 has not elapsed, and when the transmission of the image and sound information to the drive recorder 2 is over under the control of the anti-theft CPU 52 in Step k4, the procedure returns to Step h1 of FIG. 13.

As described heretofore, according to the second embodiment, the G sensor 30, which is originally provided to detect for example occurrence of an accident during vehicle driving, serves also as a sensor for keeping watch on thefts during vehicle halts. That is, not only it is possible to detect unusual vehicle conditions by means of the broken-glass sensor 58, the break-in sensor 59, and the door sensor 60 disposed in the anti-theft device 3, but it is also possible to detect a shock given to the vehicle by means of the G sensor 30 of the drive recorder 2. Thus, unusual vehicle conditions can be detected also on the basis of signals issued from the G sensor 30.

Accordingly, even if the anti-theft device 3 is in a state of being incapable of detecting unusual vehicle conditions, when a shock given to the vehicle is detected by the G sensor 30 disposed in the drive recorder 2, the information acquired by the anti-theft CPU 52 of the anti-theft device 3 that is to be transmitted to the drive recorder 2 is, just as in the case where unusual vehicle conditions have been detected by the sensors 58, 59 and 60 of the anti-theft CPU 52, stored in the second RAM 25 of the drive recorder 2 at a storage period which is shorter than that at which the information to be transmitted to the drive recorder 2 under the alert state is stored, and the information stored in the second RAM 25 is recorded on the nonvolatile ROM 21 before and after the moment of detection of unusual vehicle conditions over a certain time period.

In this way, in addition to the effects provided by the first embodiment, the following advantage can be gained: even if the anti-theft device 3 is in a state of being incapable of detecting unusual vehicle conditions, the information on the interior of the stopped vehicle having been acquired by the anti-theft CPU 52 of the anti-theft device 3 before and after the moment of detection of a shock given to the vehicle over a certain time period can be recorded on the nonvolatile ROM 21 of the drive recorder 2 without fail. Note that the construction in which the G sensor serves as both an accident detecting sensor and an anti-theft monitoring sensor is regarded per se as constituting the invention. The second embodiment of the invention is implemented by combining together the inventive feature of the sharing of the G sensor and the inventive feature of producing difference between the period at which images and so forth are transmitted before the detection of unusual vehicle conditions and the period at which images and so forth are transmitted after the detection of unusual vehicle conditions.

Moreover, although the above description as to each of the embodiments deals with the information storage apparatus 1 including the drive recorder 2 and the anti-theft device 3, the information storage apparatus 1 is not limited to such a configuration. By way of another embodiment of the invention, the information storage apparatus may be constructed of the drive recorder 2 and the anti-theft device 3 combined in a single-piece structure. In the information storage apparatus having such a structure, it is possible to achieve the same effects as achieved in the information storage apparatuses of the preceding embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and a range of equivalency of the claims are therefore intended to be embraced therein.

What is claimed is:

1. An information storage apparatus comprising:
    an acquisition section that acquires at least one of image information and sound information of an interior or outside of a vehicle;
    a storage section that stores therein the information acquired by the acquisition section;
    an unusual-condition detection section that detects a presence or absence of unusual vehicle conditions on the basis of a sense signal issued from a sensor disposed in the vehicle; and
    a storage control section that causes the storage section to store therein the information acquired by the acquisition section at a first storage interval prior to detection of unusual vehicle conditions by the unusual-condition detection section and at a second storage interval after detection of unusual vehicle conditions by the unusual-condition detection section, the second storage interval being different from the first storage interval.

2. An information storage apparatus comprising:
    an acquisition section that acquires at least one of image information and sound information of an interior or outside of a vehicle;
    a storage section that stores therein the information acquired by the acquisition section;
    an unusual-condition detection section that detects a presence or absence of unusual vehicle conditions on the basis of a signal issued from a sensor disposed in the vehicle;
    a storage control section that causes the storage section to store therein the information acquired by the acquisition section at a storage interval that varies between before and after detection of unusual vehicle conditions by the unusual-condition detection section;
    a drive recorder that acquires at least one of image information and sound information during an interval when the vehicle is being in motion; and
    a security device that acquires at least one of image information and sound information during an interval when the vehicle is parked, wherein
        the storage control section includes a recorder-side control portion included in the drive recorder and a security device-side control portion included in the security device,
        the acquisition section includes a recorder-side acquisition portion included in the drive recorder, for acquiring at least one of image information and sound information of outside of the vehicle, and a security device-side acquisition portion included in the security device, for acquiring at least one of image information and sound information of the interior of the vehicle,
        the storage section includes a recorder-side storage portion which is included in the drive recorder and is capable of storing therein the information acquired by the security device-side acquisition portion,
        the security device-side control portion effects transmission of the information acquired by the security device-side acquisition portion from the security device to the drive recorder at a transmission interval that varies between before and after detection of unusual vehicle conditions by the unusual-condition detection section, and
        the recorder-side control portion allows the recorder-side storage portion to store therein the information acquired by the security device-side acquisition portion before detection of unusual vehicle conditions by the unusual-condition detection section that is transmitted from the security device, and the information acquired by the security device-side acquisition portion after detection of unusual vehicle conditions by the unusual-condition detection section that is transmitted from the security device at different storage intervals.

3. The information storage apparatus of claim 2,
    wherein the recorder-side control portion effects setting of an interval of time at which the information acquired by the security device-side acquisition portion after detection of unusual vehicle conditions by the unusual-condition detection section that is transmitted from the security device is stored in the recorder-side storage portion, to be shorter than an interval of time at which the information acquired by the security device-side acquisition portion before detection of unusual vehicle conditions by the unusual-condition detection section that is transmitted from the security device is stored in the recorder-side storage portion.

4. An information storage apparatus comprising:
    an acquisition section that acquires at least one of image information and sound information of an interior or outside of a vehicle;
    a storage section that stores therein the information acquired by the acquisition section;
    an unusual-condition detection section that detects a presence or absence of unusual vehicle conditions on the basis of a signal issued from a sensor disposed in the vehicle;
    a storage control section that causes the storage section to store therein the information acquired by the acquisition section at a storage interval that varies between before and after detection of unusual vehicle conditions by the unusual-condition detection section;
    a drive recorder for acquiring at least one of image information and sound information during an interval when the vehicle is being in motion; and
    a security device for acquiring at least one of image information and sound information during an interval when the vehicle is parked, wherein
        the unusual-condition detection section is an impact detection section for detecting impact given to the vehicle,
        the storage control section includes a recorder-side control portion included in the drive recorder and a security device-side control portion included in the security device,
        the acquisition section includes a security device-side acquisition portion included in the security device, for acquiring at least one of image information and sound information of the interior of the vehicle, the storage section includes a recorder-side storage portion which is included in the drive recorder and is capable of storing therein the information acquired by the security device-side acquisition portion, the security device-side control portion-effects transmission of the information acquired by the security device-side acquisition portion from the security device to the drive recorder at a transmission interval that varies according to whether a value of a signal issued from the impact detection section is smaller than, or larger than or equal to a predetermined threshold, and the recorder-side control portion allows the recorder-side storage portion to store therein the information acquired by the security device-side acquisition portion when a value of a signal issued from the impact detection section is smaller than the predetermined threshold that is transmitted from the security device, and the information acquired by the security device-side acquisition portion when a value of a signal issued from the impact detection section is larger than or equal to the predetermined threshold that is transmitted from the security device at different storage intervals.

5. The information storage apparatus of claim 4, wherein the recorder-side control portion effects setting of an interval of time at which the information acquired by the security device-side acquisition portion when a value of a signal issued from the impact detection section is larger than or equal to the predetermined threshold that is transmitted from the security device is stored in the recorder-side storage portion, to be shorter than an interval of time at which the information acquired by the security device-side acquisition portion when a value of a signal issued from the impact detection section is smaller than the predetermined threshold that is transmitted from the security device is stored in the recorder-side storage portion.

6. The information storage apparatus of claim 1, further comprising:

a recording section that, upon the unusual-condition detecting section detecting the presence of unusual vehicle conditions, records the information stored by the storage section during a predetermined duration of time preceding and following the detection of the presence of unusual vehicle conditions.

* * * * *